United States Patent
Shah et al.

(10) Patent No.: US 9,009,801 B2
(45) Date of Patent: Apr. 14, 2015

(54) AUTHENTICATION AND SECURE CHANNEL SETUP FOR COMMUNICATION HANDOFF SCENARIOS

(75) Inventors: Yogendra C. Shah, Exton, PA (US); Inhyok Cha, Seoul (KR); Andreas Schmidt, Frankfurt am Main (DE); Louis J. Guccione, East Chester, NY (US); Lawrence Case, Austin, TX (US); Andreas Leicher, Frankfurt am Main (DE); Yousif Targali, Cliffwood, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 594 days.

(21) Appl. No.: 13/341,670

(22) Filed: Dec. 30, 2011

(65) Prior Publication Data

US 2013/0007858 A1    Jan. 3, 2013

Related U.S. Application Data

(60) Provisional application No. 61/428,663, filed on Dec. 30, 2010.

(51) Int. Cl.
*G06F 21/00*    (2013.01)
*H04L 29/06*    (2006.01)
(Continued)

(52) U.S. Cl.
CPC ....... *H04L 63/0815* (2013.01); *H04W 36/0038* (2013.01); *H04L 63/0209* (2013.01); *H04L 63/0892* (2013.01); *H04L 63/18* (2013.01); *H04W 12/06* (2013.01)

(58) Field of Classification Search
CPC ...................................................... G06F 21/00
USPC ......................................................... 726/26
See application file for complete search history.

(56) References Cited

U.S. PATENT DOCUMENTS

| | | | |
|---|---|---|---|
| 2005/0273513 A1* | 12/2005 | Panasyuk et al. | 709/228 |
| 2006/0182280 A1* | 8/2006 | Laitinen et al. | 380/247 |
| 2008/0064394 A1* | 3/2008 | Maes | 455/432.1 |
| 2009/0073937 A1* | 3/2009 | Xia et al. | 370/331 |
| 2011/0173105 A1* | 7/2011 | Schirilla et al. | 705/34 |

FOREIGN PATENT DOCUMENTS

EP    1 465 385    10/2004

OTHER PUBLICATIONS

3GPP TS 33.220, "3rd Generation Partnership Project; Technical Specification Group Services and System Aspects; Generic Authentication Architecture (GAA); Generic bootstrapping architecture (GBA) (Release 9)," No. V9.4.0, Mar. 2012, pp. 1-75.

(Continued)

*Primary Examiner* — William Powers
(74) *Attorney, Agent, or Firm* — Baker & Hostetler LLP

(57) ABSTRACT

Persistent communication layer credentials generated on a persistent communication layer at one network may be leveraged to perform authentication on another. For example, the persistent communication layer credentials may include application-layer credentials derived on an application layer. The application-layer credentials may be used to establish authentication credentials for authenticating a mobile device for access to services at a network server. The authentication credentials may be derived from the application-layer credentials of another network to enable a seamless handoff from one network to another. The authentication credentials may be derived from the application-layer credentials using reverse bootstrapping or other key derivation functions. The mobile device and/or network entity to which the mobile device is being authenticated may enable communication of authentication information between the communication layers to enable authentication of a device using multiple communication layers.

15 Claims, 19 Drawing Sheets

(51) Int. Cl.
*H04W 36/00* (2009.01)
*H04W 12/06* (2009.01)

(56) References Cited

OTHER PUBLICATIONS

Buddhikot et al., "Integration of wireless LAN and 3G wireless—Design and Implementation of a WLAN/CDMA2000 Interworking Architecture", IEEE Communications Magazine, Nov. 1, 2003, 41(11), 90-100.

International Patent Application No. PCT/US2011/068206: International Search Report and Written Opinion dated Aug. 6, 2012, 17 pages.

Krishnamurthi et al., "Using the Liberty Alliance Architecture to Secure JP-level Handovers", IEEE, Communication System Software and Middleware, COMSWARE 2006, Jan. 8-12, 2006, pp. 1-10.

* cited by examiner

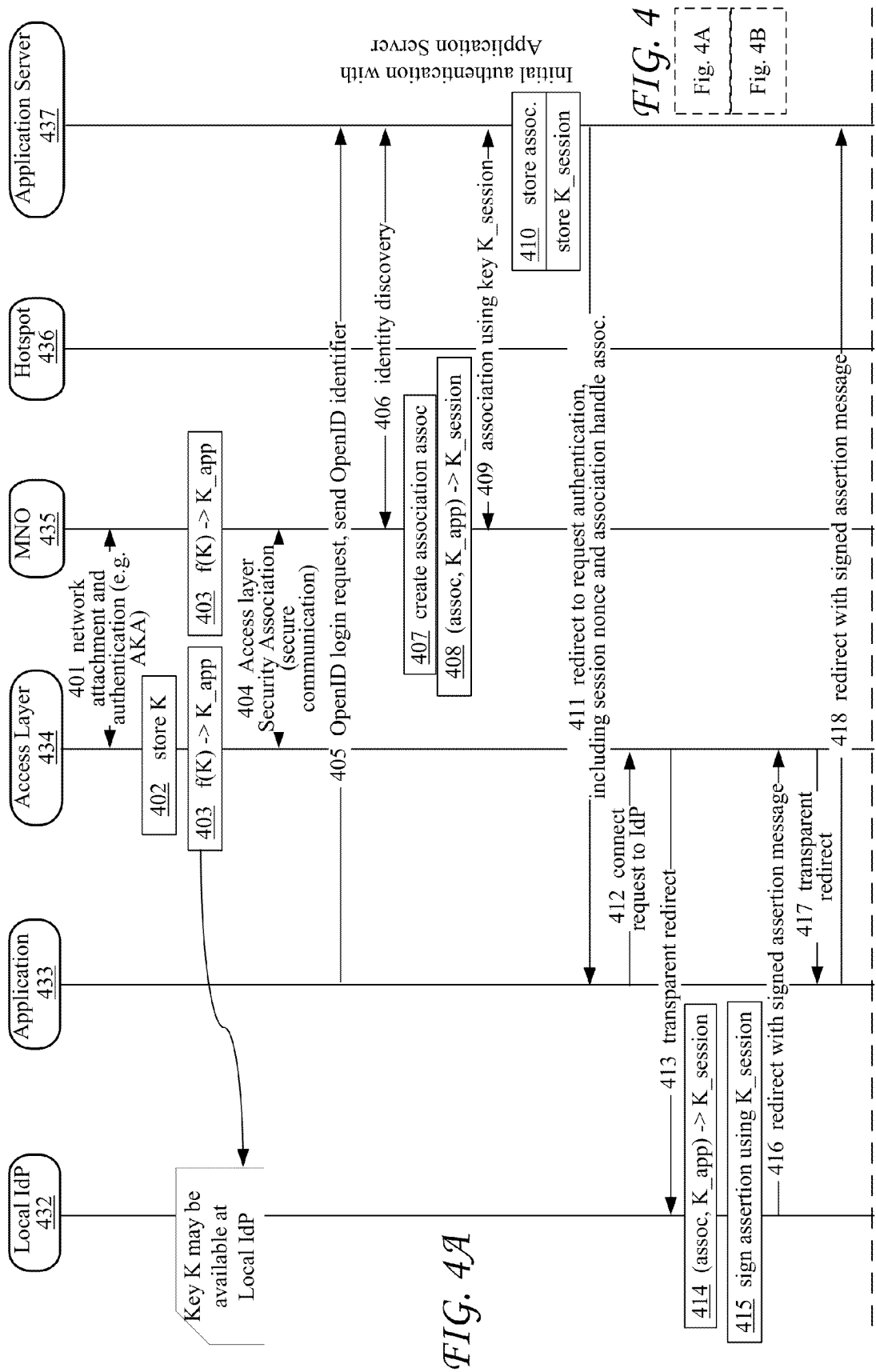

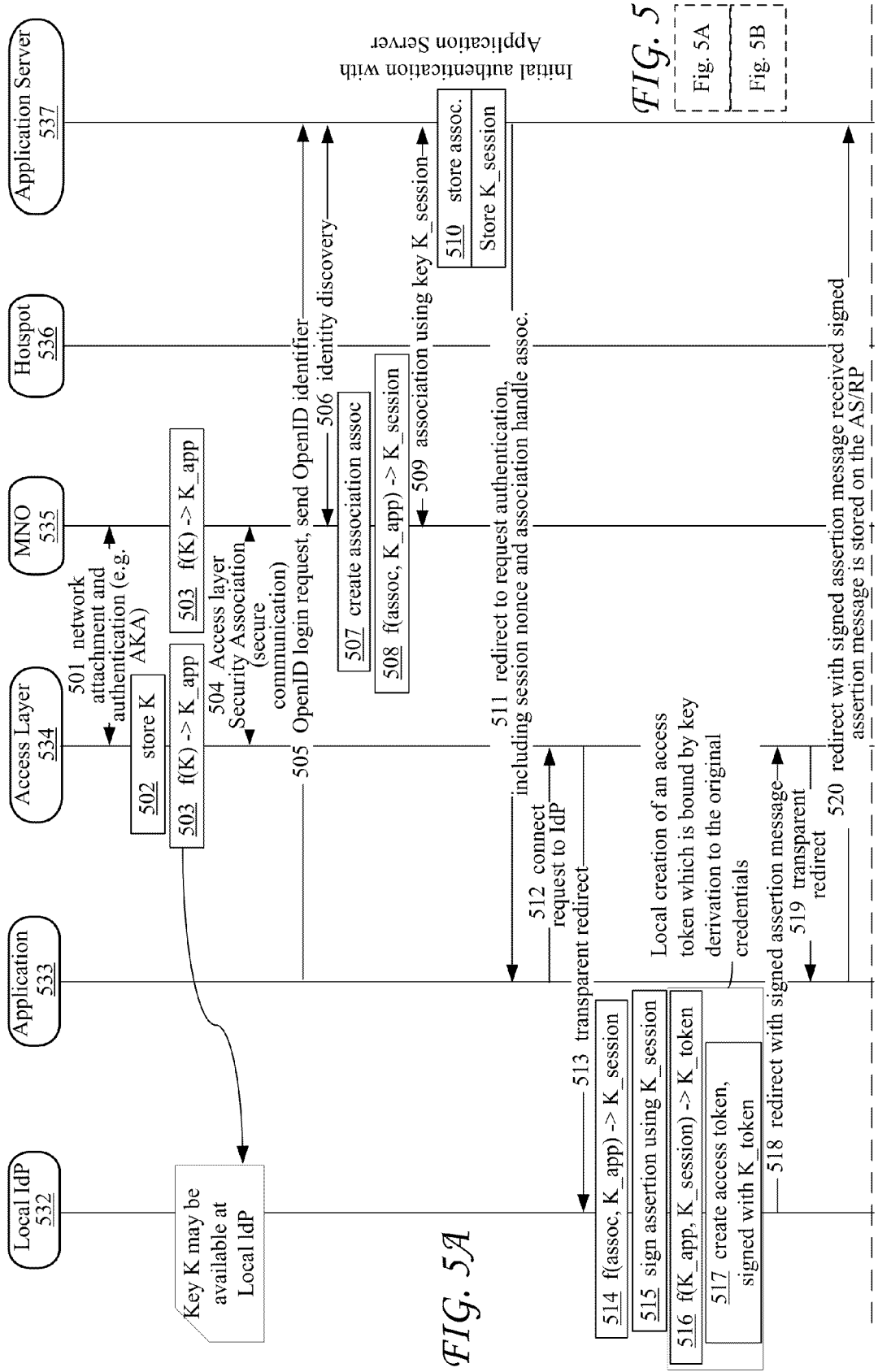

AUTHENTICATION AND SECURE CHANNEL SETUP FOR COMMUNICATION HANDOFF SCENARIOS

CROSS REFERENCE TO RELATED APPLICATIONS

This application claims the benefit of U.S. Provisional Patent Application Ser. No. 61/428,663, filed Dec. 30, 2010, the contents of which are hereby incorporated by reference in their entirety.

BACKGROUND

A user is generally able to use a service continuously while roaming across networks. When a user moves from a location being serviced by a current network to a location being serviced by a target network, a handoff may be performed, for example, at the access layer. When the handoff is performed, the user may need to be authenticated to the target network servicing the location into which the user is moving. An authentication on the access layer may occur in each handoff, and the user device may use pre-provisioned credentials for accessing the target network at the access layer.

The user's communication device may communicate using layered communication mechanisms. In many cases, the different layers of communication each require their own security. Handoffs may occur between one node in a layered network to another node. While techniques may exist to realize such handoffs, the communications may require a break of the currently used security associations or mechanisms.

According to one example, access-layer handoffs may cause such a break in the currently used security mechanisms by using an additional security establishment when a handoff takes place at the access-layer to another network. For example, the additional security establishment may include another session of authentication and/or security key agreement each time a handoff takes place at the access-layer. As access-layer handoffs may become more frequent, establishing additional security sessions each time an access-layer handoff occurs may introduce delays and/or unnecessary over-the-air communications and/or burden on the network authentication infra-structure. This may make it difficult to realize seamless handoffs.

SUMMARY

This Summary is provided to introduce various concepts in a simplified form that are further described below the Detailed Description.

Systems, methods, and apparatus embodiments are described herein for generating an authentication credential at a mobile device for authenticating the mobile device for access to services at a network server. The persistence of an authentication and the associated credentials at one layer may be used to establish credentials at another layer. As described herein, a persistent communication layer credential may be established that is shared with a network server. For example, the persistent communication layer credential may be an application-layer credential generated at an application layer or other credential generated at a persistent communication layer that survives a handoff from one network to another. The persistent communication layer credential may be established via a persistent communication layer on a first network. The persistent communication layer credential may be configured to authenticate the mobile device for receiving a service from the network server using the first network. A network communication entity on a second network may be discovered and an authentication credential may be generated based on the persistent communication layer credential. The authentication credential may be used for authenticating with the second network via a communication layer other than the persistent communication layer to enable the mobile device to receive the service from the network server using the second network.

According to another example embodiment, an authentication credential may be obtained at an application server for use in authenticating a mobile device at an application server residing on a communication network. For example, an authentication credential may be obtained that is derived from an application-layer credential. The authentication credential may be obtained via an application layer associated with the application server. The authentication credential may be configured to authenticate the mobile communication device for accessing services from the application server. The authentication credential may be sent from the application layer to another communication layer for authenticating the mobile device on the other communication layer.

According to an example embodiment, the other communication layer may be an access layer. The access layer may be a physical, data link, and/or network layer. When the other communication layer is an access layer, the authentication credential may be an access-layer credential used for authentication at the access layer.

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to in limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
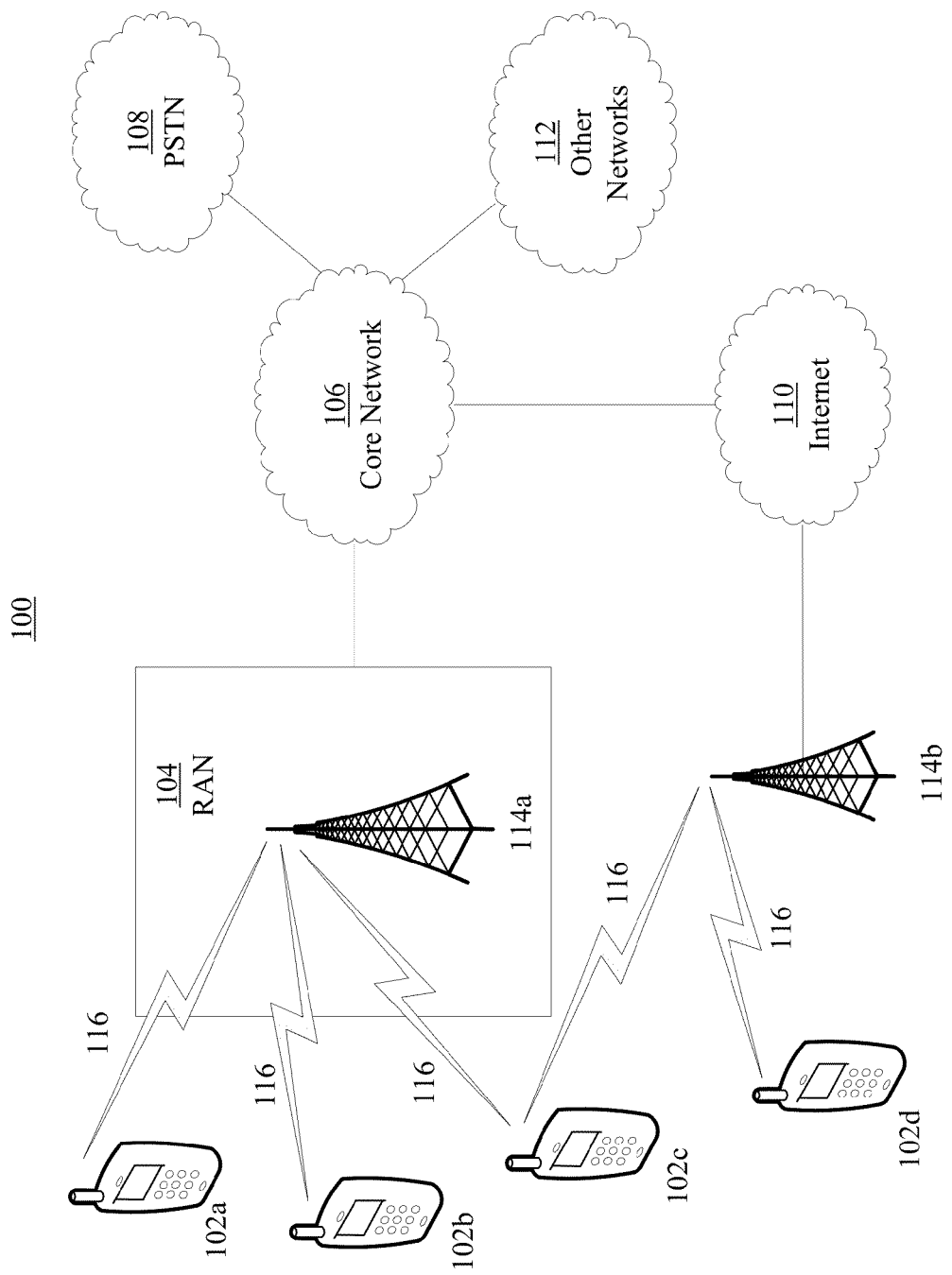
FIG. 1A is a system diagram of an example communications system in which one or more disclosed embodiments may be implemented.

Described herein are various implementations for using federated identity and Single Sign On (SSO), such as the OpenID protocol for example, to enable seamless user/device authentication and secure mobility across heterogeneous networks. The embodiments described herein may leverage credentials on one network to perform authentication on another. In one example embodiment, persistent communication layer credentials generated at a persistent communication layer on one network may be used to perform reverse bootstrapping and complete the security layer authentication and/or secure tunnel setup in an on-demand and seamless fashion on another network. According to an example embodiment, the persistent communication layer credential may be an application-layer credential generated at an application layer or another credential generated at a communication layer that survives a handoff from one network to another. While the embodiments herein describe the use of an application-layer credential to perform authentication at another layer (e.g., non-persistent communication layer) in a handoff scenario, it will be understood that any other credential may be used that is established at a persistent communication layer that survives a handoff between networks.

According to an embodiment, systems and methods are described for generating access-layer authentication credentials for use in authentication of a mobile device during a handoff (e.g., access-layer handoff). The authentication credentials may be generated so that a service that is accessed by the mobile device continues seamlessly uninterrupted during the handoff. As described herein secure communication may be established at an access layer with a first network entity. A secure application-layer communication may also be established with an application server based on the secure communication with the first network entity. The service may be received using the secure communication. A second network entity may be discovered. An authentication credential (e.g., access-layer credential) may be generated for authentication with the second network entity. The authentication credential may be generated using application-layer information associated with the application-layer communication. The authentication credential may be generated while the service is seamlessly uninterrupted during the handoff.

According to an example embodiment, authentication may be performed during a handoff from one network to another, using a single sign on (SSO) protocol for example, to enable access to services from an application server by a wireless communications device. For example, the handoff may be from a cellular communications network (e.g., 3GPP network) to a wireless local area network (WLAN) (e.g., browser-based WLAN or 802.1x/EAP-based WLAN). The SSO protocol may be based on a Generic Bootstrapping Architecture (GBA). The SSO protocol may also implement OpenID. The SSO protocol may be used to implement key derivation functions, such as reverse bootstrapping for example, for generation of authentication credentials used for authenticating a user and/or device at the application server. The application server may include an authentication, authorization, and accounting (AAA) server acting as an OpenID provider (OP) or a relying party (RP). According to another embodiment, the application server may include a wireless local area network (WLAN) gateway or a WLAN access point (AP) acting as an RP. The WLAN AP may allow SSO exchanges between the UE and another SSO entity.

A description of terms used herein is provided. Local identity provider (local IdP) is a term for a client-localized entity and functions of such entity that enables identity assertion for a user/device made locally, i.e., on or very near to the device. RP is Relying Party in the OpenID protocol or other application service provider attempting to verify a user's/device's identity and having a trust relationship with an identity provider. OP is an OpenID provider in the OpenID protocol or an identity provider who may authenticate the user and/or device on behalf of an application service provider. GW is a Gateway, such as an entity controlling internet traffic between connected entities for example. BA is a browsing agent. U is a generic mobile user. UE is a generic mobile user's mobile device.

Local Mobile SSO is a term used to collectively indicate methods whereby part or whole of the single sign-on (SSO) and/or related identity management functions traditionally performed by a web-based SSO server may be performed locally on the device. The Local Mobile SSO may be performed by a locally-based entity and/or module, which may be a part or whole of the communicating device itself for example. The locally-based entity/module may be physically and/or logically located (i.e., locally located) in close vicinity of the communicating device and/or its user (e.g., where such entity/module is embedded in the device, or attached or connected by local interfaces or wiring or short-range wireless means to the device).

Local OpenID is a term used to indicate a subset of Local Mobile SSO whereby the SSO or identity management may be based on the OpenID protocol. The part or whole of the functions of an OpenID Identity Provider (OP or OpenID IdP) may be performed by the locally located entity/module.

Local OP is a term used to indicate the entity or module that performs the part or whole of the functions of an OpenID server. The local OP may be a local IdP that is implemented using an OpenID protocol. While the term local OP may be implemented in embodiments described herein, it will be understood that the local IdP may be used in similar embodiments that do not implement the OpenID protocol. OPloc may also be used to denote a local OP. One of the functions of a local OP may be to facilitate authentication of the user and/or the wireless communications device through assertion(s) about the identity of the user and/or the device. Such an assertion may be sent from the local OP to the device (e.g., at the device's browser agent) which may forward the assertion to the external Relying Party (RP). When the function(s) provided by a local OP are primarily limited to providing such identity assertion, a local entity performing such function(s) may be called a local Assertion Provider (LAP).

A local OP may process (e.g., create, manage, and/or send) one or more assertion message(s). The local OP may use these messages to assert to the state of verification of one or more identities relating to a user and/or a device. This assertion may be made to one or more external recipient of such messages. A third-party entity, such as a Relying Party (RP) for example, may be one of the recipients of such assertion message(s). The local OP may sign such assertion messages, such as by using a cryptographic key for example.

Local OpenID methods may use one or more cryptographic keys. One such key, which may be called a root session key and may be denoted by Krp, may be a session key intended for use between the RP and the OP to serve as a root session key out of which other keys may be derived. Another such key, which may be called an assertion key and denoted by Kasc, may be the signing key which may be used to sign one or more of the assertion message(s) for authentication of the user. Kasc may be derived from the Krp.

Local OpenID may also be implemented using a service called OpenID Server Function (OPSF), whose role may be to generate, share, and/or distribute secrets to be used by the local OP and optionally by the Relying Party (RP). The OPSF and the local OP may be viewed by the external RP as a single entity. The OPSF may be able to verify signatures issued by the local OP, and may be directly reachable for the RP via public internet or other wired or wireless communication for example. The device (e.g., via its browser) may be redirected to the local OP, such as by modifying the local DNS resolving cache on the device such that the address of the OPSF may map to the local OP for example. Local OpenID may also use a service denoted by OP-agg, whose role may be to facilitate discovery of local OP on behalf of the RP.

The aforementioned terms and descriptions may be referenced in the embodiments described herein. While the embodiments herein may be described using OpenID terms and/or portions of the OpenID protocol, it will be understood that these embodiments are not limited to the use of OpenID protocol or OpenID entities.

According to an example embodiment, as further described herein, a mobile communication device, such as a smart phone for example, may communicate using layered communications. The mobile communication device may establish communication at an access layer, such as with an access-layer network for example. The mobile communication device may also establish communication at an application layer or access layer, such as with an application service provider and/or such provider's application-layer network or access network respectively. At each layer the communications may each have their own security. Such layer-specific security may implement authentication and/or security key agreement at each layer. Authentication and/or security key agreement at the higher layer, such as the application-layer for example, may utilize security keys and/or other security-related information, such as security association contexts at a lower layer for example, to derive the keys or other security-related parameters for the application-layer. Such techniques may be referred to as bootstrapping techniques for example.

According to an example embodiment, when the mobile device switches its access-layer communication from one access network to another, such a process may be referred to as an access-layer handoff. Access-layer handoffs may occur due to movement of the communicating device for example. Access-layer handoffs may occur between one access-layer node, such as a base station for example, in an access-layer network to another such node, such as another base station for example. The two access-layer nodes may be in the same network, between one access-layer network and another, or in a different access-layer network for example. It may be desirable for access-layer handoffs to be transparent to the user of the mobile communicating device. It may also be desirable for the access-layer handoffs to be non-interruptive to perform continuous, smooth operation of application-layer communication.

Application-layer security credentials may be used to help establish access-layer security, such as during an access-layer situation for example. According to an example embodiment, a delegated authentication, which may implement OpenID for example, may be performed at the application-layer to aid discovery and/or attachment at the access of the subsequent network during handoff.

According to an embodiment, bootstrapping may be used. Access-layer security keys may be derived out of security material available at the existing application-layer communication. For example, the access-layer security keys may be derived out of security material established using a delegated form of authentication, such as GBA or OpenID for example.

According to another embodiment, reverse bootstrapping may be used. Access-layer security keys may be derived out of security material available at the existing application-layer communication. For example, the access-layer security keys may be derived out of security material established using a delegated form of authentication, such as OpenID for example.

A local assertion provider may also be used when performing authentication as described herein. For example, a local OP may be used as part of the OpenID protocol used at the application-layer. The local OP may facilitate seamless authentication and/or key agreement during an access-layer layer handoff. Access-layer authentication and/or key agreement as well as access-layer authorization may be enabled during a seamless handoff.

Figure 1B:
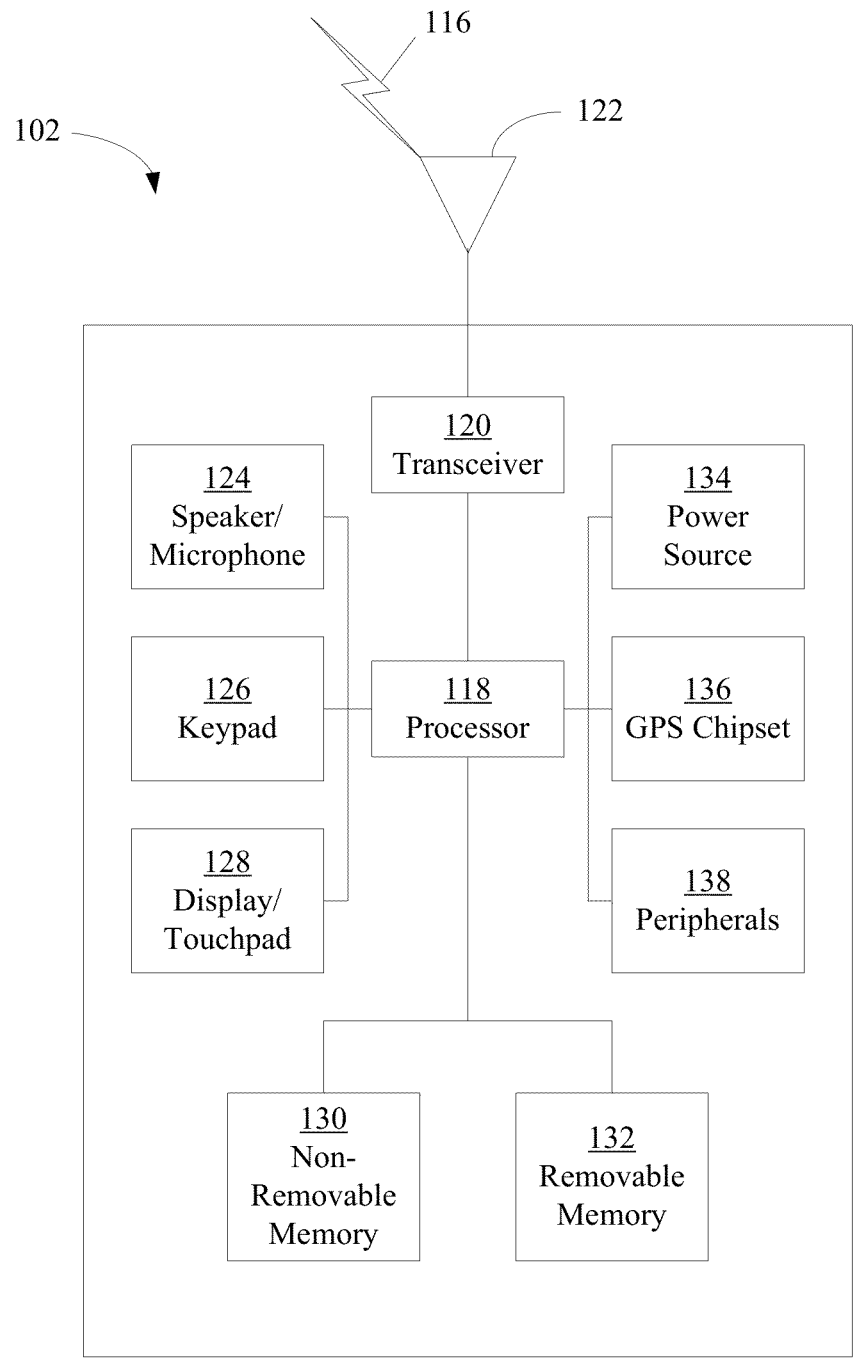
FIG. 1B is a system diagram of an example wireless transmit/receive unit (WTRU) that may be used within the communications system illustrated in FIG. 1A.
Figure 1C:
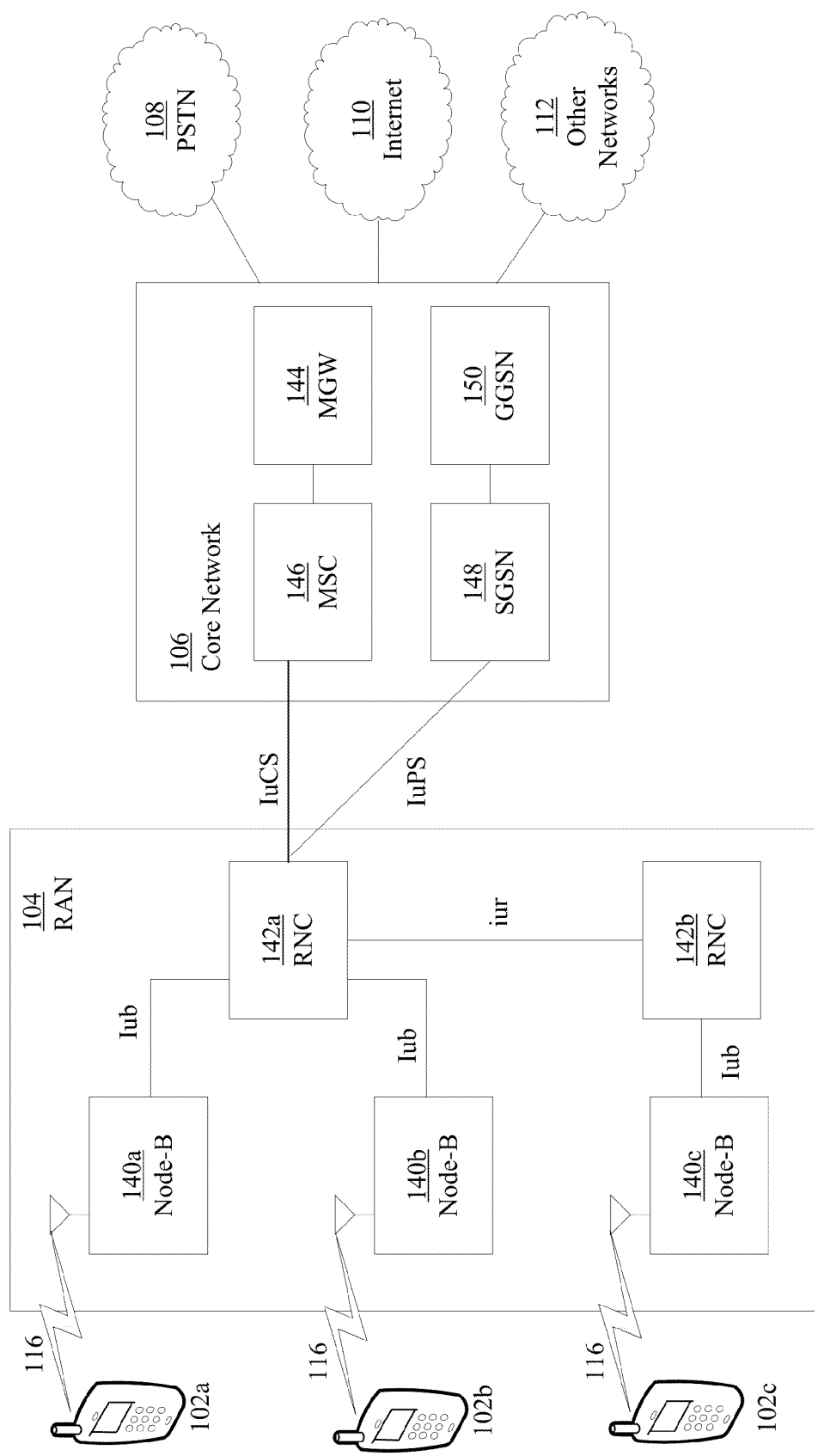
FIG. 1C is a system diagram of an example radio access network and an example core network that may be used within the communications system illustrated in FIG. 1A.

FIGS. 1A-1C illustrate examples of network communications systems and/or devices that may be implemented in the embodiments described herein. FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a tablet, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and/or the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, Home Node B, Home eNode B, femto cell base station, or access point, for example, and may utilize any suitable RAT for facilitating wireless connectivity in a localized area, such as a place of business, a home, a vehicle, a campus, and/or the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and/or the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. The processor 118 may perform application-layer programs (e.g., browsers) and/or radio access-layer (RAN) programs and/or communications. The processor 118 may perform security operations such as authentication, security key agreement, and/or cryptographic operations, such as at the access-layer and/or application layer for example.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and/or receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, and/or any other type of memory storage device. The removable memory 132 may include a subscriber identity module (SIM) card, a memory stick, a secure digital (SD) memory card, and/or the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out and/or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

The communications systems and/or devices described above may be used in authenticated handoff scenarios as described herein. Authenticated handoffs may enable a user to use a service and/or application, continuously, while the user changes between access networks and/or access points in the same, or a different, access network. The handoff decision may be performed at the access layer and/or the application layer for example. This may mean that an authentication on each layer may occur in each handoff, and/or that the user device may be pre-provisioned with credentials for the target network/access point. This may call for a centralized infrastructure and/or credential pre-provisioning. An independent delegated authentication entity may be used to avoid the establishment of multiple service level agreements (SLAs) with mobile network operators (MNOs) or a tight coupling with the MNO authentication infra-structure in facilitating seamless authentication while roaming across multiple forms of networks. A federated identity management scheme, such as OpenID for example, and/or access to the Internet may be supported by the authentication embodiments described herein.

Figure 2:
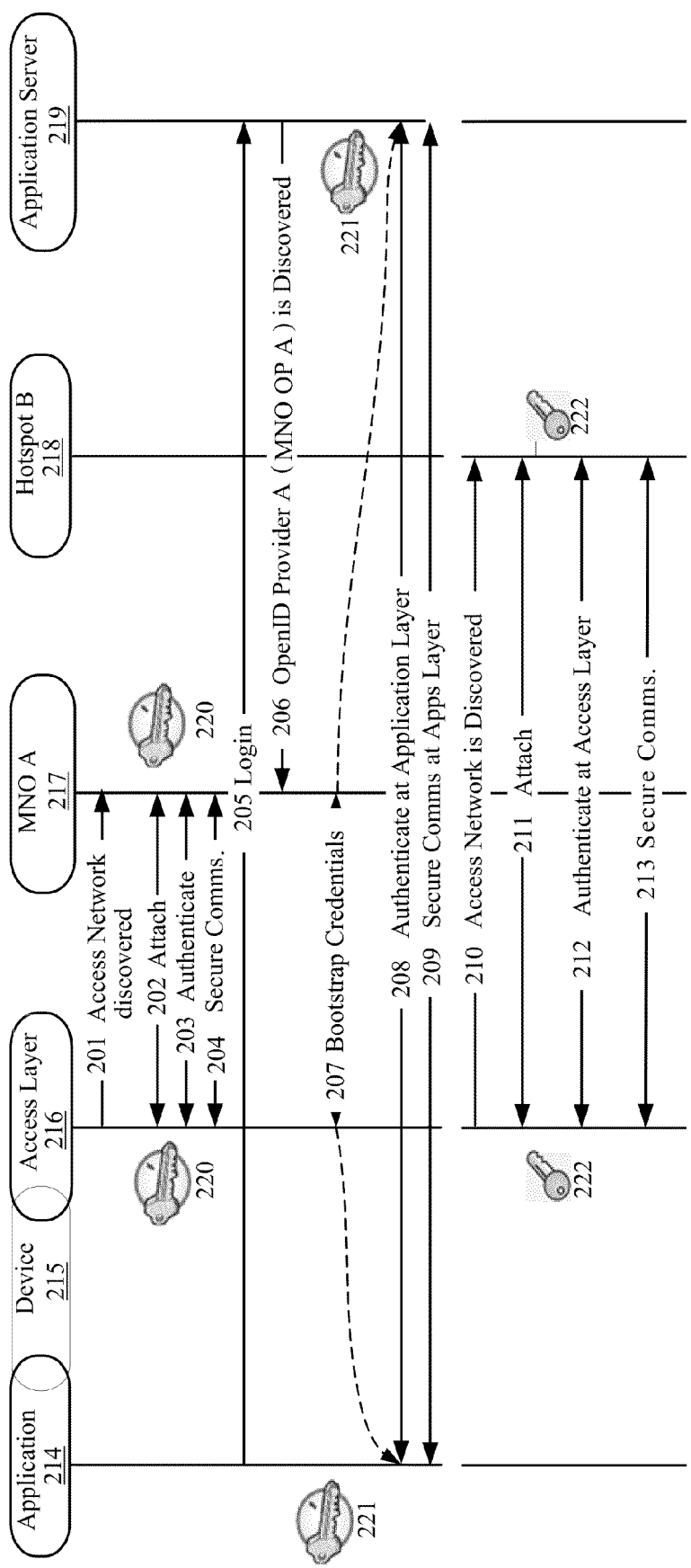
FIG. 2 is a flow diagram illustrating a handoff scenario for an application layer session.

One example of a device performing an access layer handoff using pre-provisioned credentials is illustrated in FIG. 2, where a device 215 switches between two access networks. FIG. 2 is a flow diagram illustrating a handoff scenario for an application layer session. The handoff scenario illustrated in FIG. 2 includes device 215, that includes or is in communication with an application 214 capable of communicating on an application layer and access layer module 216 capable of communicating on an access layer. The handoff scenario illustrated in FIG. 2 may also include an MNO A 217, a Hotspot B 218, and an application server 219. The MNO A 217 and/or the Hotspot B 218 may be enabled with OpenID server functionality capable of delegated authentication server in their application layer functions. The delegated form of authentication method may be OpenID for example. Therefore, MNO A 217 may be denoted as MNO OpenID Provider (OP) A 217 (that is, this entity may have an MNO A's access-layer functionality as well as an OpenID server functionality) and/or Hotspot B 218 may be denoted as Hotspot OP B 218. The device 215 may communicate with MNO A 217 and/or Hotspot B 218 via access layer module 216. The device 215 may also communicate with the application server 219 via application 214.

As illustrated in FIG. 2, the device 215 may switch between a cellular network, from a Mobile Network Operator (MNO) A 217 for example, and a femto or WLAN network, such as a Hotspot B 218 for example. The device 215 may use access layer credentials 220 that are bootstrapped on the device application and/or network application server 219 to create application layer credentials 221 for authentication at the application layer. The device 215 may then attach to a subsequent network (e.g., WLAN network) at Hotspot B 218 and perform authentication using pre-provisioned credentials 222 between the device 215 and the Hotspot B 218.

As shown in the handoff scenario illustrated in FIG. 2, at 201 the device 215 may discover the access network of MNO A 217. The device 215 may attach and/or authenticate to the access network of MNO A 217 at 202 and 203, respectively. For example, the device 215 may attach and/or authenticate to the access network of MNO A 217 via the access layer module 216. The device 215 may authenticate to MNO A 217 using authentication credential 220. The authentication credential 220 may be a pre-provisioned credential between the device 215 and the MNO A 217 for example. If the authentication at 203 is successful, the device 215 and the access network of MNO A 217 may set up secure access layer communication via access layer module 216 at 204.

The device 215 may use the MNO A 217 network to attempt to login to the application server 219 to access services from the application server 219. For example, an application 214 on the device 215 may log in to the network-based application server 219 at 205. The application server 219 may act as a Relying Party (RP) and the MNO A 217 may act as an OpenID Identity Provider (OP). For example, at 206 the application server 219 may discover MNO A 217 and/or request MNO A 217 to authenticate the user. The request and/or authentication may be performed using OpenID for example. At 207, between the device's application 214 and MNO A 217, acting as an OP, application-layer authentication credentials 221 may be bootstrapped (e.g., generated or derived) from the access-layer credentials 220 that had enabled access-layer authentication for the device's access layer module 216 to the access layer of MNO A 217. The device 215 and/or its application 214 may be redirected to MNO A 217 and may authenticate to the MNO A 217 at the application-layer at 208 using the application-layer authentication credential 221 boot-strapped from the access-layer credentials 220. The bootstrap of the credentials 221 at 207 may be performed as a part of the authentication at 208 or independently. MNO A 217 may assert the authentication status of the device 215 to the application server 219 that is acting as a relying party (RP) (not shown). Secure communication at the application layer may be established between the device's application 214 and network-based application server 219 at 209.

At 210 the device's access-layer module 216 may discover Hotspot B 218. Hotspot B 218 may be a node on a WLAN and may also enable the device 215 to access services on the application server 219. According to an example embodiment, the device 215 may discover the Hotspot B 218 when it comes into range of the Hotspot B 218's servicing area. The device 215 may attempt to attach to the Hotspot B 218 based on user preferences, application requirements, Hotspot conditions, and/or service provider policies stored on the device 215. At 211, the device 215 may attach to the Hotspot B 218 at the access layer via access-layer module 216. According to one embodiment, the application-layer connectivity that is set up at 209 may survive the subsequent access-layer attachment (to Hotspot B 218) that occurs at 211.

At 212, the device 215 may use credentials 222 to authenticate to the Hotspot B 218 via access-layer module 216. The credential 222 used at 212 may not have anything to do with the credentials 220 or credentials 221 used for authentication at 203 and 208 respectively. Therefore, at 212 the authentication to device 215 may use pre-provisioned access-layer credentials 222 that may be suitable for authentication to the subsequent target access network (e.g., Hotspot B 218). If authentication is successful at 212, the device 215 and Hotspot B 218 may establish secure communications at the access layer at 213.

As described above, FIG. 2 illustrates an authentication protocol for enabling a device 215 to perform handoffs and/or access layer authentication on subsequent networks using pre-provisioned credentials 222. Various implementations are also described herein for leveraging persistent credentials such as access-layer or application-layer credentials for handoff to complete the authentication and/or secure tunnel setup at other layers (e.g., access layer) in an on-demand and seamless fashion.

Figure 3:
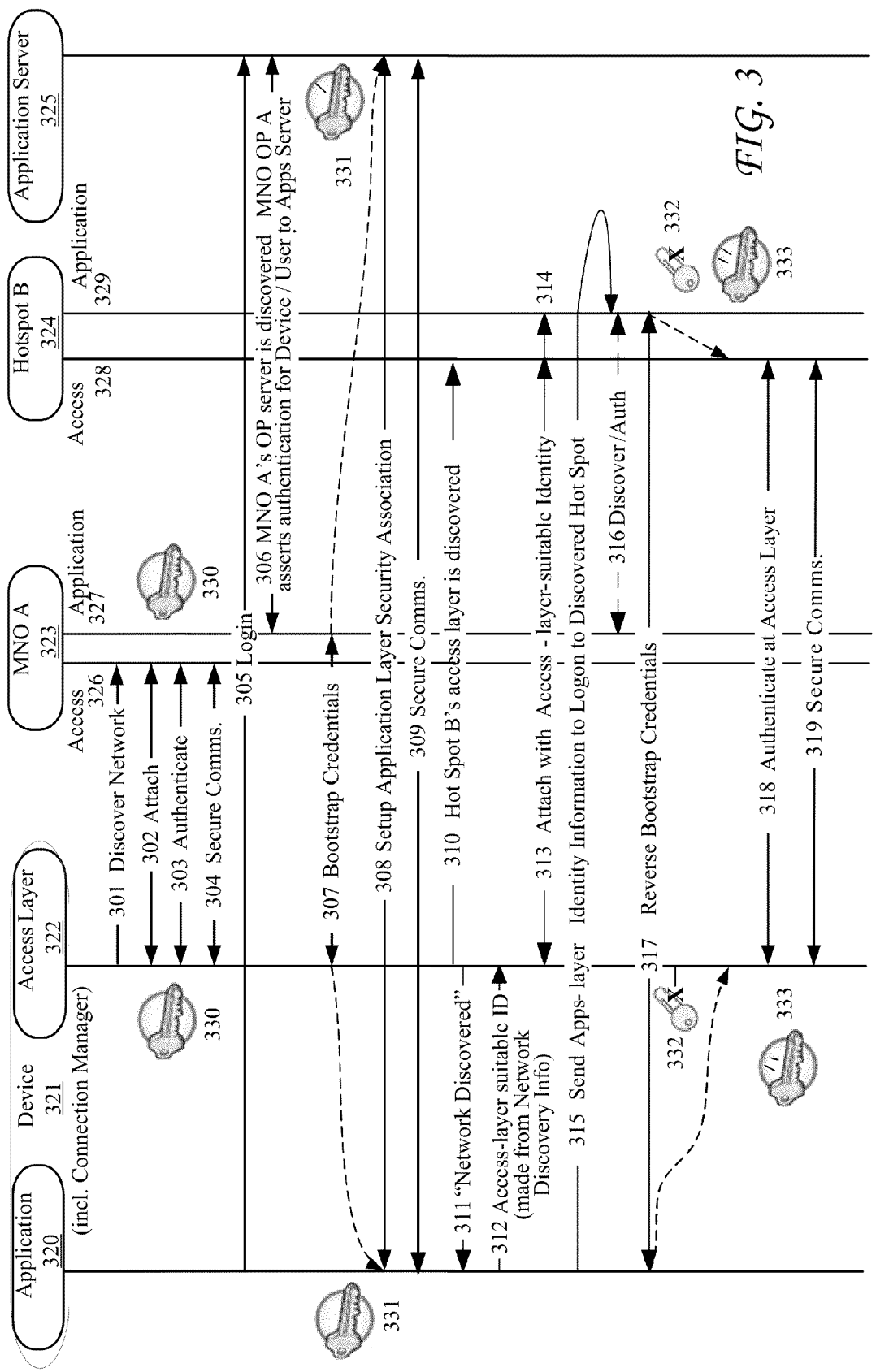
FIG. 3 is a flow diagram illustrating another handoff scenario for an application layer session.

According to an example embodiment, the application-layer credentials may be leveraged to generate access layer credentials (e.g., by performing a reverse boot-strap of the application-layer credentials) that may be used in a follow-on subsequent access-layer authentication procedure. As illustrated in FIG. 3, a handoff scenario may implement reverse bootstrapping of application-layer credentials 331 to perform authentication at a subsequent network. The handoff scenario illustrated in FIG. 3 includes device 321, which includes or is in communication with an application 320, capable of communicating on an application layer, and access layer module 322, capable of communicating on an access layer. The access layer module 322 may include and/or be in communication with a connection manager (CM) on the device 321. The handoff scenario illustrated in FIG. 3 also includes an MNO A 323, a Hotspot B 324, and an application server 325. The MNO A 323 may communicate with other network entities via access layer 326 and/or application layer 327. MNO A 323 may act as an OpenID provider. The Hotspot B 324 may communicate with other network entities via access layer 328 and/or application layer 329. The Hotspot B 324 may act as a Relying Party (RP). The access layer module 322 may communicate with MNO A 323 access layer 326 and/or Hotspot B 324 access layer 328. The application 320 may communicate with the application server 325, MNO A 323 application layer 327, and/or Hotspot B 324 application layer 329. The application server 325 may also act as the Relying party (RP) according to some embodiments described herein.

As illustrated in FIG. 3, application layer credentials may be generated and reverse bootstrapped to generate access layer authentication credentials 333 for authentication with a subsequent access network Hotspot B 324, such as in a handoff scenario for example. Reverse bootstrapping may include the application layer authentication by MNO A 323 on behalf of the target access-layer network Hotspot B 324 to generate material to be used to generate subsequent access-layer authentication credentials 333. Reverse-bootstrapping may be conditioned on at least one of: 1) the identity of the user/device 321 in the source network MNO A 323, and/or 2) the application-layer identity (e.g., an OpenID identity) of the user/application 320 as regards to the application server 325 or MNO A 323 for example.

A previous successful application layer authentication by MNO A 323 may be used to authorize access to the network Hotspot B 324. Additional authentication information may also be provided to the network Hotspot B 324 to aid in access-layer authentication of device 321. For example, the application layer authentication may be used to authorize access to the network Hotspot B 324 when assertions (e.g., "user comes from network MNO A 323 and is authenticated") are provided to network Hotspot B 324.

According to one embodiment, a call flow may be provided as illustrated in FIG. 3. At 301-309 call flows may set up an access layer security association and an application-layer security association using an application layer bootstrapping procedure, which may bind the access layer credentials to the OpenID process. For example, the access layer security association may be established between the device 321 and the MNO A 323 at 301-304. At 301, the access layer module 322 may discover the MNO A 323 network via access layer 326. The access layer module 322 may attach to MNO A 323 at 302 and perform authentication at 303. The access layer authentication at 303 may be performed using access layer credentials 330 that are shared between the device 321 and the MNO A 323. The access layer credentials 330 may be pre-provisioned credentials or credentials established by reverse bootstrapping the application-layer credentials from another network as described herein. If access-layer authentication is successful between the device 321 and the MNO A 323, a secure communication on the access layer 326 may be established at 304 between device 321 and the MNO A 323.

The application layer security association may be established between the device 321 and the application server 325 at 305-309. For example, at 305 the application 320 may attempt to login to application server 325. At 306, the MNO A 3230P server may be discovered by the application server 325 via application layer 327 and the application server 325 may redirect the user/device 321 to the MNO A 323 for authentication. The MNO A 3230P may authenticate the user/device 321 and/or assert authentication for the user/device 321 to the application server 325 at 306. The user/device 321 may then be redirected to the Hotspot B 324.

At 307, between the application 320 and MNO A 323, application-layer credentials 331 may be bootstrapped (e.g., generated or derived) from the access-layer credentials 330 that had enabled access-layer authentication between the device 321 and the MNO A 323 and/or the authentication assertion from MNO A 323. The application 320 and the application server 325 may setup an application layer security association at 308 using the application-layer credentials 331. The application layer security association at 308 may result in application layer credentials shared between the application 320 and application server 325. The bootstrapping of credentials 331 at 307 may be performed as part of the application layer security association at 308 or independently. Secure communication at the application layer may be established between the device's application 320 and network-based application server 325 at 309.

At 310, the device 321 may discover Hotspot B 324. For example, a local component on the device 321, such as the access layer module 322 for example, may discover Hotspot B 324, and/or its identification information (e.g., an SSID or an IP address). Hotspot B's application layer 329 may be discoverable, and may have been discovered and/or reached using access-layer 328 network discovery information, such as its IP address, via the public Internet for example. The access layer module 322 may include a connection manager (CM), that may be implemented in discovering Hotspot B 324 and/or making connection decisions. Hotspot B 324 and/or its identification information may be discovered via access layer signaling, such as a beacon channel for example. Some discovery may be performed based on the relationship between the MNO A 323, Hotspot B 324, and the discovered information about Hotspot B 324 from the device 321. Based on the discovered information (e.g., strength of signal, location, etc.) from Hotspot B 324, the access layer module 322 on the device 321 may decide that the device 321 should switch to the Hotspot B 324 for network communications. The access layer module 322 may communicate this command to the device's application 320. For example, the CM may send the application-layer network discovery info to the device's application 320 at 311.

The device 321 may be configured in such a way that the transfer of bootstrap credentials (e.g., generated using a key derivation process) between the application-layer and access-layer is feasible. The application 320 may process the network discovery information to generate an identity suitable for the access-layer network. According to one embodiment, the identity suitable for the network's access layer may be the OpenID URL or email address login of the user/device 321 that may be further processed/manipulated (e.g., hashed to a unique user/device identity) to a format suitable for identification to the Hotspot B 324 on the access layer 328. Optionally, information elements such as a nonce or sequence counter value may be mixed into the hashing and/or some of these information elements may be communicated to the Hotspot B 324. The device's application 320 may determine the suitable access-layer identity based on its application-layer identity established at 308 and/or Hotspot B 324's access layer discovery information. The access-layer identity may be bound to the application-layer identity and sent to the access layer module 322 at 312 for a subsequent transmission.

At 313, the device 321 may attach to the access layer 328 of Hotspot B 324 using the access-layer suitable identity, and the device's access layer module 322 may relay the access-layer identity suitable for that network's access layer to Hotspot B's access layer 328. The access layer identity of the device 321 may then be passed to the Hotspot B's application layer 329 at 314 to inform the application layer 329 so that it can identify the device 321 by its access layer identifier. The application layer 329 of the Hotspot B 324 may be physically separated from the access layer 328 but logically associated. At 315, the application 320 of the device 321 may send application-layer identity information, and optionally the access layer identity, to the Hotspot B's application layer 329. This application-layer identity may be provided to logon to the Hotspot B 324 for example. The application-layer identity may be bound to the access-layer identity of device 321.

When the application-layer identity and the access-layer identity information are communicated via the application layer 329, the application-layer identity and/or the discovered Hotspot B 324 information may be used to perform OpenID-based discovery of MNO A 323 at 316. The sending of identity information at 315 may occur at the same or a different time as call flows 313 to 314 for example. Examples of the application layer identity information may include the OpenID URL or email address login identity or assertion for example. The identity information may also include supplemental information of the user/device 321.

The Hotspot B 324 may consolidate and/or correlate (e.g., at the access layer) both the access-layer identity information received from its access layer 328 and the bound application-layer identity and access-layer identity information received from the application layer 329. The Hotspot B 324 may determine whether the messages received at 313 and 315 are from the same user/device 321. For example, at the application layer 329, the Hotspot B 324 may identify the application-layer identity received at 315 as being bound to the access-layer identity received at 314. After confirming that it is talking to the same user/device 321 on its access layer 328 and its application layer 329, the Hotspot B 324 may act as an RP together with the MNO A 323, acting as an OP. The Hotspot B 324 may perform discovery of the MNO A 323 and the MNO A 323 may be directed to the user/device 321 for authentication (e.g., by running an OpenID protocol) at 316. The device application 320 may authenticate with the MNO A application 327 (e.g., at the OP at the application layer 327). Subsequent to a successful authentication, the device 321 may be redirected back to the Hotspot B 324 application 329. At 317, the Hotspot B 324 and the device 321 may each generate an access-layer credential 333 from the successful application layer authentication using a key derivation function. For example, the application 320 and the application layer 329 of Hotspot B 324 may perform a reverse bootstrapping procedure at the application layer, which may allow the user/device 321 and/or Hotspot B 324 to create access-layer credentials 333. Thus, the access-layer credentials 333 may be a by-product of the application-layer authentication procedure performed at 316. These access-layer credentials 333 may be sent to the access layer module 322 of the device 321 and/or the access layer 328 of Hotspot B 324. At call flows 318 and 319, using the access-layer credentials 333 generated at the application layer, the device 321 and Hotspot B 324 may perform authentication and set up an access-layer secure association for communication. After authentication, the access-layer credentials 333 may be stored and/or associated with the user/device 321 when it subsequently attempts to authenticate with the Hotspot B 324 at the access layer 328.

According to an embodiment, a user with a mobile device 321 may connect to MNO A 323. The user may authenticate to a service provider, such as a video service provider for example, with a bootstrap authentication procedure. This authentication may use the pre-provisioned access layer credentials 330 on the device 321, using any of various techniques that are known to a person of ordinary skill in the art, as long as credentials are bootstrapped as illustrated at 307 in FIG. 3, which may uniquely associate the application layer identity to the network identity. The MNO A 323 may act as an OpenID provider. The Hotspot B 324 may act as a Relying Party (RP). According to an example embodiment, while accessing the service, such as viewing the video from the video service provider for example, the user may move in reach of a Hotspot B. Network Hotspot B may provide, for example, higher bandwidth at lower cost, and/or may be affiliated with, for example, an OpenID network (or associated with MNO A 323 or another MNO for example). The user may be in principle allowed to access the affiliated OpenID network (or associated MNO A 323). For example, the user may prove that the user is associated with the OpenID provider, MNO A 323.

The device 321 may discover the subsequent network Hotspot B 324, such as by listening to the beacon and/or broadcast messages for example, and/or ascertain information about the subsequent network. The information may be passed on, through a connection manager (CM) for example, from the access layer module 322 to the application 320 which may use this information to contact Hotspot B 324 at the application layer 329 with the user/device 321 application-layer identity. The device 321 may send identity information over the access layer 322 and 328 to Hotspot B 324.

When the identity information is communicated via the access layer 328, but not the application layer 329, the user/device 321 identity information may be passed up to the application on the Hotspot B 324, as illustrated at 314 for example. The Hotspot B 324 may format the information in a manner suitable for OpenID-based discovery of the MNO A 323. The identity information may be sufficient for the Hotspot B 324 to discover the MNO A 323 and/or attempt to authenticate the requesting user/device 321 at 316. The Hotspot B 324, which may be acting as a Relying Party for example, may run the OpenID protocol to redirect the user/device to be authenticated by the MNO A 323. The MNO A 323, which may be acting as an OpenID server for example, may run the OpenID protocol to authenticate the user/device 321. If the user/device 321 is successfully authenticated, then Hotspot B 324 may establish a secure connection between the device 321 and the network at 319.

The Hotspot B 324 and user/device 321 may create shared credentials based on the successful OpenID based authentication. For example, the user/device 321 and/or Hotspot B 324 may reverse bootstrap subsequent access layer credentials 333. Some discovery may be done based on the relationship between the Hotspot B 324 and the MNO A 323. This information may be obtained via the user/device 321 application-layer identity and/or discovered Hotspot B 324 information from the application 320 on the device 321. If the user/device 321 is authenticated by MNO A 323, then a secure connection may be established between the device 321 and the network through (reverse) bootstrapping of credentials from the Hotspot B 324 application to its access network.

According to one embodiment, for Hotspot B 324 to reverse bootstrap access-layer credentials 333 from application-layer credentials 331, the Hotspot B 324 may have a capability where its access-layer functions and application-layer functions are designed such that cross-layer communication and data manipulation/processing is possible and/or where there is a relationship between the layers. The reverse bootstrapping may occur seamlessly to the user without the need to pre-provision or install credentials 332 in the device 321 for the subsequent network Hotspot B 324 and/or manual intervention.

The embodiments described herein for performing authentication at an access layer of a subsequent network may have remarkable properties at the user level. For example, a user may enter a user or device identifier (e.g., OpenID identifier) to log on to a service and the user may be able to access previously unknown access networks (e.g., the Hotspot B 324) while the service may continue seamlessly uninterrupted. Authentication credentials, such as access layer credentials 333 for example, may not be pre-provisioned at the subsequent network since they may be reverse bootstrapped from the already running application service security or from the application layer authentication. The service may be fixed wire and/or wireless. The service may even be an isolated access point (AP) at a user's home that may be reachable via the public Internet and/or similar access means for example.

According to an embodiment, if application-layer security is to be re-established after a handoff (e.g., access-layer handoff), forward bootstrapping that binds security credentials for such subsequent application-layer authentication to security credentials established at various previous instances (e.g., credentials used in the handoff access layer authentication, credentials used in previous application-layer authentication, or even credentials used in access-layer authentication before the handoff) may be used.

In the embodiments described herein, an independent identity provider may be used. For example, the MNO A 323 may not be an OpenID Identity Provider and/or the identity management function may be performed by another third party. The third party identity provider may play the role of an OpenID provider using a pre-established relationship with the MNO A 323, and use a protocol such as OpenID/EAP-SIM or OpenID/GBA bootstrapping capability for example, to authenticate and bootstrap application-layer credentials 331 from the MNO A 323 provisioned access layer credentials 330. The same, or similar, bootstrapping process may be used later to bootstrap access layer credentials 333 for the Hotspot B 324 utilizing the MNO A 323 provisioned credentials on the device 321.

According to another embodiment, a network-initiated handoff may be implemented. In a network-initiated handoff, the handoff may be initiated by a network, such as an access network or application server for example. In one example, the MNO A 323 may continually monitor the device 321, which may include such information as the device's location, measurement information, quality of service, and/or the like. The MNO A 323 may be aware of the local environment around the device 321. If the MNO A 323 is also an OpenID provider, the MNO A 323 may send a message to the user/device at the application layer to instigate a handoff with Hotspot B 324, with appropriate parameters to enable the device 321 to discover and initiate a handoff. A seamless handoff may be performed as described herein. In another embodiment, the MNO A 323 may send the handoff trigger information to the device 321 via the access layer communications with the device 321.

According to another embodiment, the MNO A 323 may place a request to the nearby local access node(s) to attempt to attach and/or authenticate with the device 321 when the device is in range of the node. It may not be the MNO A 323 which triggers the handoff. Any network component with sufficient information about the device 321, the device's local communications environment, and/or an entity having the ability to communicate with the user/device 321 may be able to trigger the handoff. In these cases, the network component may discover the subsequent access network (e.g., Hotspot B 324) and/or negotiate security capabilities and radio access capabilities for communication to the user/device 321. The network component may communicate this information as well as the handoff information to the user/device 321.

According to another embodiment, an application-assisted credential bootstrapping may be performed. In application-assisted credential bootstrapping, the application 320 on the device 321 may tell the application server 325 that the application server 325 may bootstrap a set of credentials for the subsequent access network Hotspot B 324 with the help of the application 320 to facilitate the handoff. The application 320 may send the identity relating to the discovered Hotspot B 324, such as an IP address for example, and optionally its OpenID login-like request, to the application server 325. The application server 325 may act like an OpenID provider to negotiate security capabilities of the Hotspot B 324. The application server 325 may reverse bootstrap a set of access-layer credentials 333 for the Hotspot B 324 and the device 321 at the access layer. The application 320 on the device 321 and Hotspot B 324 may authenticate with each other and/or establish a secure channel as illustrated at 318. Some discovery may be performed based on the relationship between the application server 325 and the target Hotspot B 324. This information may be obtained via the discovered information from the application 320 on the device 321.

The credentials for a subsequently discovered network authentication may be pre-processed at both endpoints to enable faster completion of the authentication procedures later. This may be based upon knowledge that the network holds of the local area where the device is located or in which the device is moving towards. If pre-configured on the device to look for handoff opportunities, the device may at some periodic frequency search for alternate networks and, if detected, seek a handoff. The pre-processing on the network side may be carried out at or for more than one alternate access node. The device and/or network may cache credentials used for the networks it has used previously. The device and/or network may later re-use these credentials for authentication. This re-use of credentials may be useful when a device returns to a node which it had left earlier for example. The re-use of credentials may also be useful for alternative dynamic selection of one or more nodes (e.g., in a locally dynamically varying noisy channel or quality of service environment).

The embodiments described herein may use local OpenID. For example, a standalone local OpenID may be implemented. As described herein, a protocol flow may utilize a local OpenID and grant access/authorization.

Figure 4B:
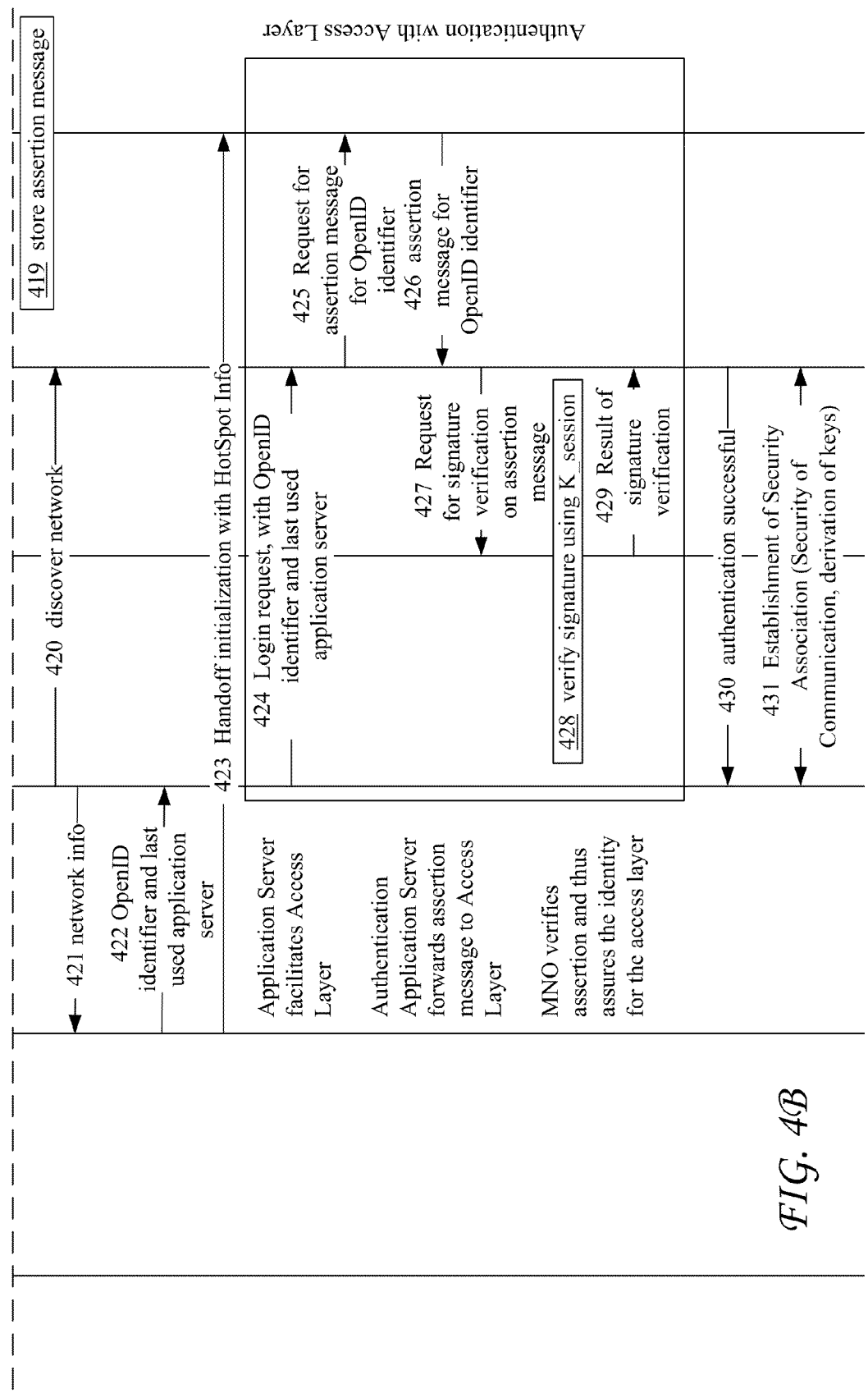
FIG. 4 is a flow diagram illustrating protocol realization using local OpenID.

FIG. 4 is a flow diagram illustrating protocol realization using standalone local OpenID. As illustrated in FIG. 4, the flow diagram may include communications between a local IdP 432, an application 433 (e.g., a browsing agent), an access layer module 434, an MNO 435, a hotspot 436, and/or an application server 437. The local IdP 432 may be located on a user's wireless communications device. The application 433 and/or the access layer module 434 may be located on the same, or different, wireless communication device as the local IdP 432.

The protocol illustrated in FIG. 4 enables seamless handoff and/or set-up of a subsequent access-layer security association. The protocol may implement access-layer security between the device and the device's current access-layer network and/or application-security previously established between the user/device and an external application server (AS) 437, such as by using a client-localized OpenID (i.e., local OpenID) protocol for example.

As illustrated in FIG. 4, the device may be authenticated at the application layer with the application server (AS)/RP 437 using a combination of steps 401-419 and the device may be authenticated with a subsequent network (e.g., hotspot 436) at the access layer using a combination of steps 419-431. At 401 a device access layer module 434 may attach to the MNO 435. The device's access layer module 434 and MNO 435 may use shared credentials to authenticate. As a result of authentication, access-layer key K may be established on the device's access-layer module 434 and/or the MNO 435. At 402, the access layer key K may be stored on the device. For example, the access layer key K may be stored on a trusted environment on the device, such as a subscriber identity module (SIM) card, a universal integrated circuit card (UICC), trusted platform module (TPM), or other trusted environment for example. The trusted environment may be included on the device, or connected to the device as a separate module or a separate device/equipment for example. The trusted environment may include the local IdP 432. According to an example embodiment, the trusted environment and the local IdP 432 may be the same entity. However, the trusted environment may also include the application 433, access layer module 434, and/or other entities located on the device for example.

At 403, MNO 435 and device access layer module 434 may both derive an application-layer key K_app from access layer key K (i.e., K_app=f(K), where f is some function known to both the MNO 435 and the device's access layer module 434). Application-layer key K_app is made available to local IdP 432. Access-layer security association is established between the device access layer module 434 and MNO 435 using access-layer key K at 404.

At 405, a user may login, via application 433, to application server (AS) 437. The user may login with an OpenID provider (OP) identifier (e.g., URL or email address) for example. The AS 437 may be acting as a Relying Party (RP), and thus may be referred to herein as AS/RP 437. At 406 AS/RP 437 may perform identity discovery of MNO 435. At 407 an association between MNO 435 and AS/RP 437 may be setup and an association handle may be generated. MNO 435 may derive a session key K_session from application key K_app and the association handle at 408. At 409, K_session may be passed to AS/RP 437 using an association security protocol and K_session may be used as a subsequent association key. At 410, AS/RP 437 may store session key K_session and the subsequent association information. Application 433 may be redirected on the device at 411 to authenticate with the local IdP 432. The redirect message may include the session nonce and/or association handle. At 412, the application 433 may request connection to local IdP 432 through card access layer module 434. The request may include the session nonce and/or association handle for example. At 413, redirection to local IdP 432 may be performed. The redirection may also include the session nonce and/or association handle. At 414, local IdP 432 may derive a signing key K_session using application-layer key K_app and the association handle. Local IdP 432 may have access to application-layer key K_app on the device. Local IdP 432 may create an OpenID assertion message, and sign it using K_session at 415. At 416, local IdP 432 may redirect the signed OpenID assertion message back to the device's access-layer module 434 through card access. The device's access-layer module 434 may transparently redirect the signed OpenID assertion to the device's application 433 at 417. The device's application 433 may redirect the signed OpenID assertion message at 418, along with the nonce received in step 411, to the external AS/RP 437. AS/RP 437 may store the received signed assertion message at 419.

Once the device is authenticated at the application layer with the AS/RP 437, the device may be authenticated with a subsequent network (e.g., hotspot 436) at the access layer using credentials or keys from the application-layer authentication. As illustrated in FIG. 4, at 420 the access layer module 434 of the device may discover the hotspot 436. A local entity (e.g., connection manager (CM)) on the device may decide that the device should switch to the discovered hotspot 436. At 421, the device's access layer module 434 may pass hotspot 436 information to the device's application 433. At 422, the device's application 433 may pass the OpenID identifier (e.g., URL or email address), along with the last used application server 437 identification, to the access layer of the hotspot 436 for subsequent discovery. The device's application 433 may alert the AS/RP 437 with initiation of handoff at 423. The initialization of the handoff at 423 may be performed using the discovered hotspot 436 information. The device's application 433 may determine the access-layer suitable identity based on its application-layer identity established at 418 and/or Hotspot B 436's access layer discovery information. The access-layer identity may be bound to the application-layer identity and sent to the access layer module 434 at 422 for a subsequent transmission.

As illustrated in steps 424-429 of FIG. 4, the AS/RP 437 may facilitate access layer authentication of the device. For example, the AS/RP 437 may forward assertion messages to the access layer module 434. The MNO 435 may verify the assertions, thus assuring the identity for the access layer. At 424, the device's access layer module 434 may issue a login request to the hotspot 436. Included in this message may be the OpenID identifier (e.g., URL or email address), as described at 422 for example, and/or the last application server used identification. At 425, the hotspot 436 may request authentication information for the device and its user from the AS/RP 437. For example, the hotspot 436 may request an assertion for the OpenID identifier (e.g., URL or email address) that it has received from the access layer 434 of the device. At 426, the AS/RP 437 may return the signed assertion message, which was received by the AS/RP 437 at step 418 and which corresponds to the OpenID identifier received in step 425, to the hotspot 436. At 427, the hotspot 436 may request signature verification from the OpenID service in the MNO 435, for the signed assertion message corresponding to the OpenID identifier (e.g., URL or email address). At 428, the MNO 435 may verify the signature (e.g., at the OpenID server). MNO 435 may have session key K_session from step 408. The MNO 435 may provide (e.g., using its OpenID server) a signature verification message to the hotspot 436 at 429.

If the authentication was successful, the hotspot 436 may send authentication success acknowledgment at 430 to the access layer module 434 of the device. The device's access-layer module 434 and hotspot 436 may setup an association at 431 to secure their common channel. Derivation of symmetric key structure may secure communication. At step 431 of the protocol illustrated in FIG. 4, various alternative methods, known to a person of ordinary skill in the art, may be used for deriving an access-layer key/credential. For example, a key derivation function may be used on a signature-verified application-layer assertion message.

The implementation of reverse bootstrapping may be explicit or implicit as described herein. For example, the protocol illustrated in FIG. 4 may implement reverse bootstrapping implicitly. Reverse bootstrapping may be performed implicitly when the access-layer security association is envisioned to be established based on assertions provided from the application layer, rather than explicitly deriving access-layer keys and/or credentials directly from application-layer credentials for example. Explicit reverse bootstrapping may occur when an access-layer key is derived via an explicit process of reverse bootstrapping, such as directly from application-layer credentials for example.

Figure 5B:
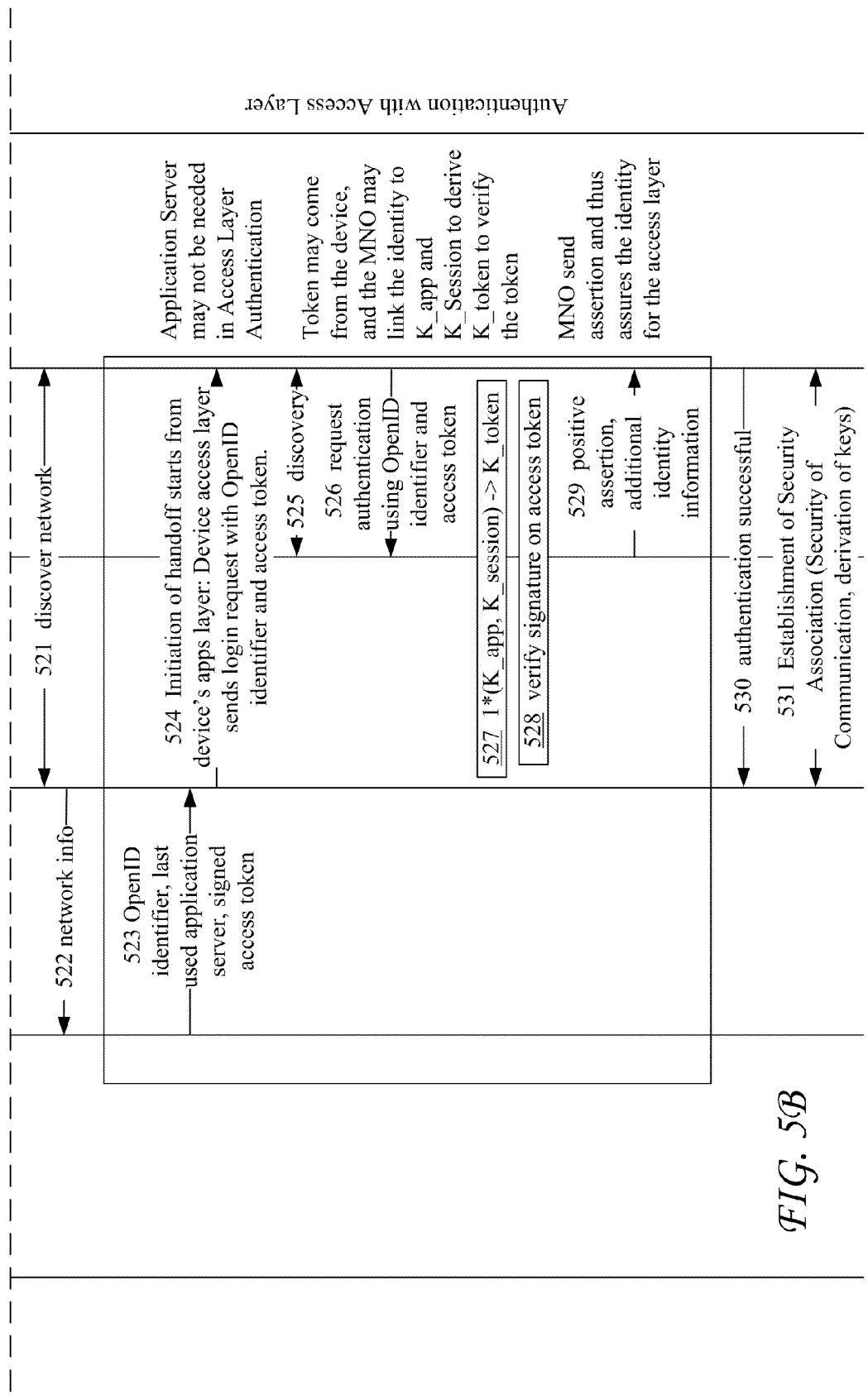
FIG. 5 is a flow diagram illustrating protocol realization using local OpenID and that grants access/authorization.

According to another embodiment, a protocol may enable seamless handoff that also grants access/authorization. For example, FIG. 5 is a flow diagram illustrating a protocol that enables seamless handoff using implicit reverse bootstrapping that also grants access/authorization. Use of the protocol illustrated in FIG. 5 may enable the hotspot 536 to obtain access-layer handoff and authorization for access to services or user's private data for example.

As illustrated in FIG. 5, at 501 a device's access-layer module 534 may attach to the MNO 535, such as at the access-layer for example. The device's access-layer module 534 and the MNO 535 may use shared credentials to perform mutual authentication. The shared credentials may be access-layer shared credentials for example. As a result of authentication, access-layer key K may be established on both the device's access-layer module 534 and the MNO 535, such as at the MNO's access layer for example. At 502, the access-layer key K may be stored on the on the device. For example, the access layer key K may be stored on a trusted environment on the device. The trusted environment may be included on the device, or connected to the device as a separate module or a separate device/equipment for example. The trusted environment may have local IdP 532 functionality. The trusted environment may be the same entity as the local IdP 532, as illustrated in FIG. 5.

At 503, MNO 535 and/or device access layer module 534 may derive application-layer key K_app from access-layer key K (i.e., K_app=f(K), where f may be some function known to both the MNO 535 and the device's access layer 534), where K_app may be made available to local IdP 532. Access layer association may be established between device access layer module 534 and MNO 535 using K_app at 504.

A user may login at 505 to AS/RP 537 on the application layer via application 533. For example, the user may login with OP identifier (e.g., URL or email address). At 506, AS/RP 537 may perform discovery of MNO 535. At 507, association between MNO 535 and AS/RP 537 may be setup and an association handle may be generated. MNO 535 may derive K_session from K_app and the association handle at 508. At 509, K_session may be passed to AS/RP 537, such as by using original association security and K_session as a subsequent association key for example. At 510, AS/RP 537 may store K_session and the subsequent association information. Application 533 (e.g., BA) may be redirected by AS/RP 537 on the device to authenticate with local IdP 532 at 511. The message may include the nonce and/or association handle. The application 533 may request connection at 512 to local IdP 532 through the access layer 534. The request may include the nonce and/or association handle. At 513, redirection to local IdP 532 is performed. The redirection message may also include the nonce and/or association handle.

At 514, local IdP 532 may derive a signing key K_session (e.g., for signing assertion messages) using K_app and the association handle. Local IdP 532 may have access to K_app. Local IdP 532 may create an OpenID assertion message, and sign the assertion message using K_session at 515. At 516 local IdP 532, acting as provider of locally produced access/authorization token, may derive a signing key K_token. The signing key K_token may be later used to sign an access/authorization token. One way to derive such K_token may be by using a key generation function (KGF) which takes both K_app and K_session as inputs. For example, K_token=f (K_app, K_session). At 517, local IdP 532, acting as provider of locally produced access/authorization token, may create an access/authorization token, and/or sign it with K_token. Local IdP 532 may redirect the signed assertions (both the signed OpenID assertion and the signed access/authorization token) back to the device's access-layer through the access layer 534 (e.g., card access) at 518. At 519 the device's access-layer 534 may redirect the signed assertions (the OpenID assertion and the access/authorization token) to the device's application 533 (in a transparent redirection). At 520 the device's application (e.g., BA) may redirect the signed assertions (the OpenID assertion and the access/authorization token), along with the nonce received at 511, to the external application AS/RP 537. The AS/RP 537 may store the received signed assertion message.

At 521, the device may discover the hotspot 536 via its access layer module 534. The connection manager (CM) on the device may decide that the device should switch to the discovered hotspot 536. The device's access layer module 534 may pass subsequent hotspot information to the device's application 533 at 522. At 523, the device's application 533 may pass the OpenID identifier, along with the last used application server identification, to the hotspot 536 access layer. The device's application 533 may alert the AS/RP 537 with initiation of handoff to the discovered hotspot 536 at 524. This may be done by the device's access-layer module 534 sending a login request, such as to the hotspot 536 for example. Included in this message may be the OpenID identifier and/or the access token. The application 533 may have this token from step 519. The hotspot 536 may discover the MNO 535's OpenID/OAuth server at 525. At 526, the hotspot 536 may request the MNO 535's OpenID/OAuth server to authenticate the user/device and authorize access using the OpenID identifier and/or the signed access token. The MNO 535's OpenID/OAuth server may compute the signing key K_token at 527. The signing key K_token may be computed in the same way the K_token was computed in step 516 for example. At 528, the MNO 535's OpenID/OAuth server may verify the signature of the received access token using the K_token it has computed from step 527. The MNO 535's OpenID/OAuth server may send a positive assertion for the access-token, along with any additional identity information for the user/device, to the hotspot at 529. At 530, if the authentication is successful, the hotspot 536 may send an authentication success acknowledgment to the device at the access layer module 534. At 531, the device 531's access-layer module 534 and the hotspot 536 may mutually set up a security association. Derivation of keys and/or secure communication may follow.

As described herein, application-layer credentials may be used to generate credentials used in a follow-on access-layer or IP-layer authentication in Universal Access Method (UAM)-based and/or Extensible Authentication Protocol (EAP)-based public hotspots, as described herein.

The implementation options for OpenID integration with UAM-based public hotspots may include various implementations in which different network entities may act as a relying party (RP) or an OpenID provider (OP). For example, a hotspot authentication, authorization, and accounting (AAA) server may act as an RP, a hotspot wireless local area network (WLAN) gateway may act as an RP, a hotspot captive portal may act as an RP, a hotspot access point (AP) may act as an RP (e.g., for a small hotspot, such as a hotspot used in a café), and/or a hotspot AAA server may act as an OP. Example embodiments of OpenID-UAM integration using a hotspot AAA server and a WLAN gateway that implement RP functionality may be illustrated in FIGS. 6 and 7. It will be understood that the other embodiments may be similar in implementation but have different deployment models.

According to an example embodiment, a user with a mobile device may connect to an MNO A acting as an OP server. The user may authenticate to a service with a bootstrap authentication procedure using pre-provisioned access layer credentials on the device. The bootstrap authentication procedure may uniquely associate the application layer identity to the network identity. By way of example, authentication may be performed using OpenID, but any other similar authentication protocol may be used. When OpenID is being implemented, the MNO A may act as an OpenID provider and/or a WLAN gateway at Hotspot B may act as a Relying Party.

Figure 6:
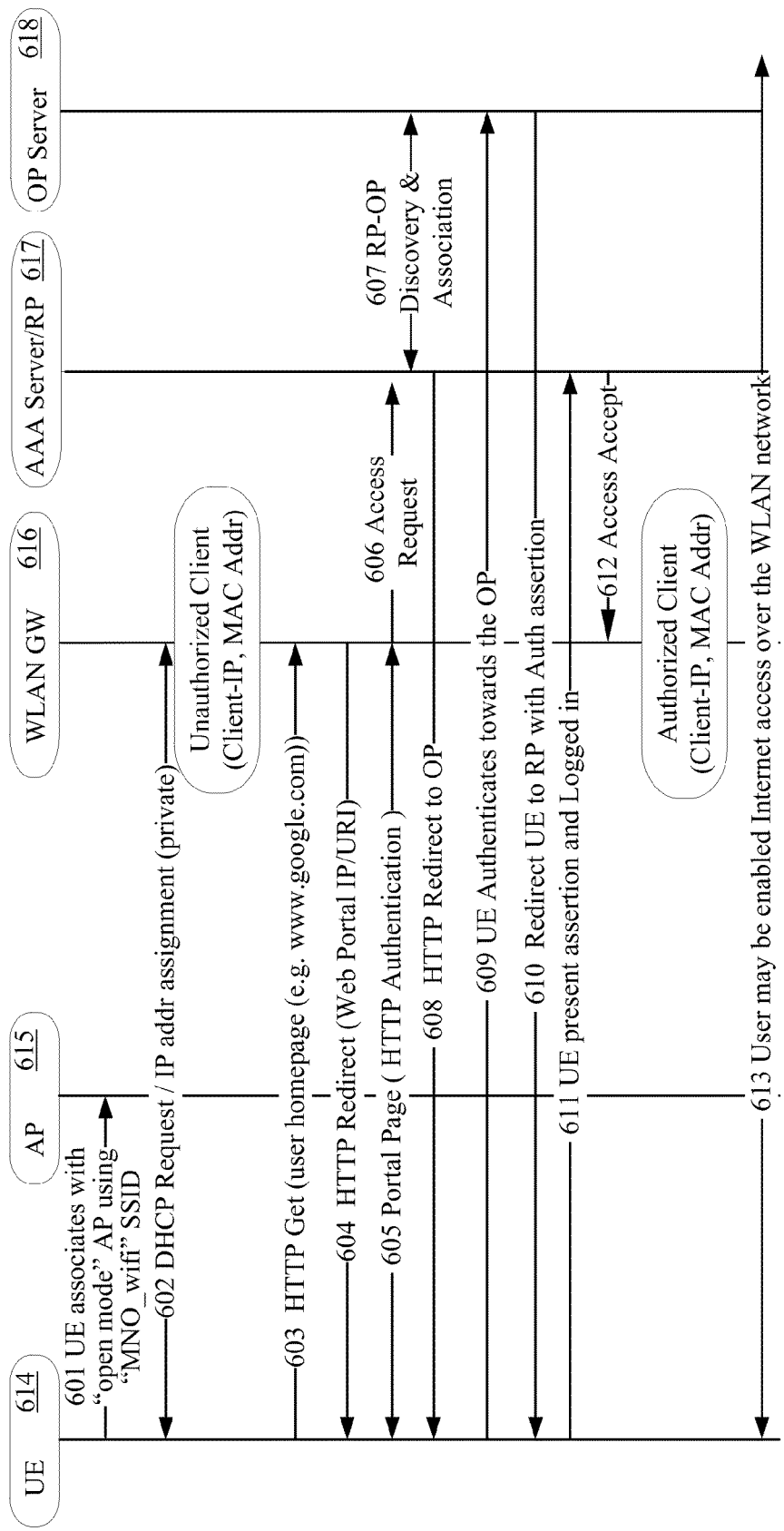
FIG. 6 is a flow diagram illustrating Universal Access Method (UAM)-OpenID integration with an authentication, authorization, and accounting (AAA) server acting as a relying party (RP)
Figure 7:
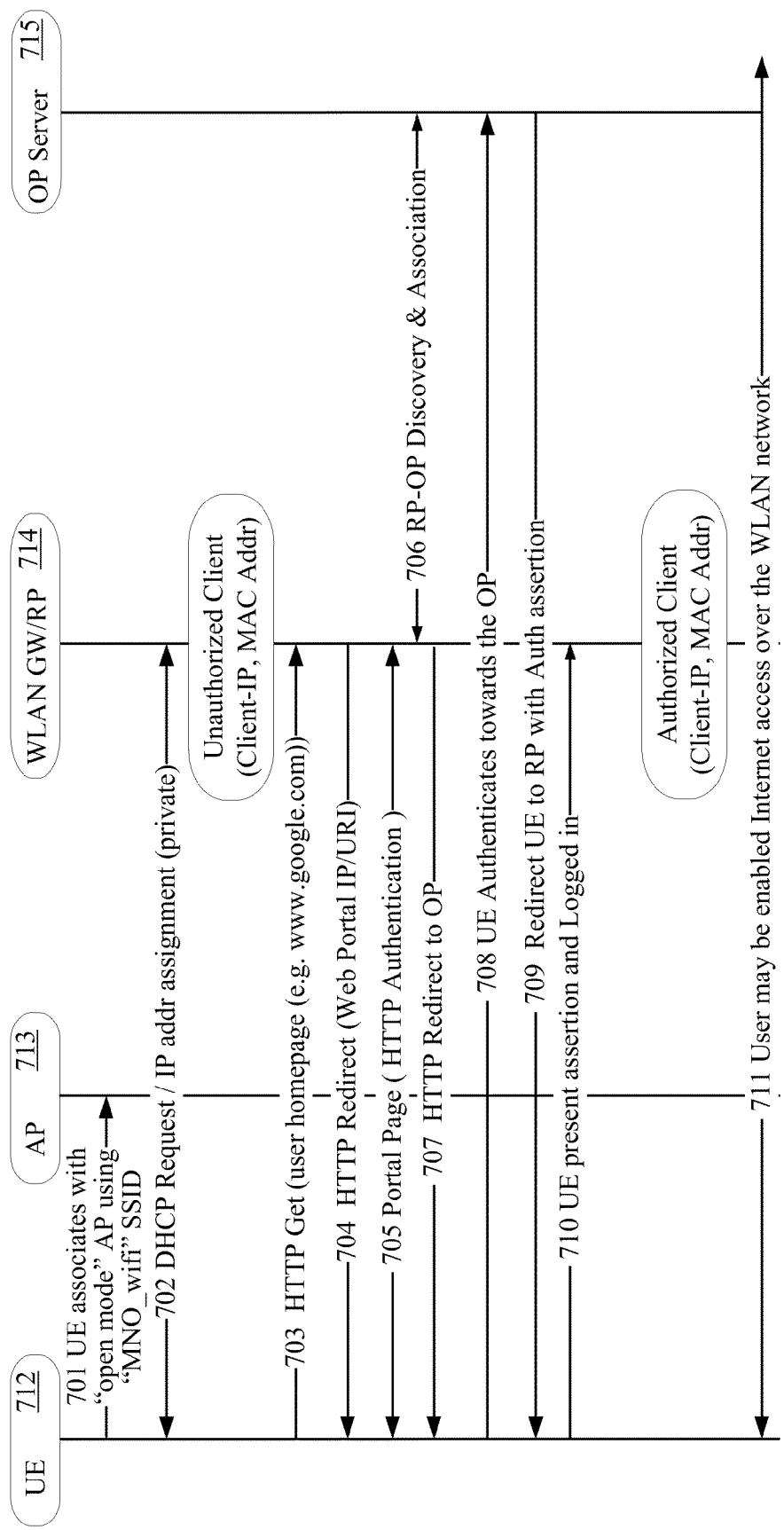
FIG. 7 is a flow diagram illustrating UAM-OpenID integration with a wireless local area network (WLAN) gateway (GW) acting as an RP.

After the device connects to the MNO A, the device may discover another network (e.g., by listening to the beacon or broadcast messages) and/or ascertain information about the newly discovered network at the access layer. The information may be passed on, through a connection manager (CM) for example, to the application on the device. The application on the device may use the information about the discovered network to contact a WLAN gateway at a Hotspot B at the application layer with the user/device identity. This identity information may be sufficient for an AAA server acting as RP, as illustrated in FIG. 6, and/or a WLAN gateway acting as an RP, as illustrated in FIG. 7, to discover the MNO A and attempt to authenticate the requesting user/device. An OP←→RP protocol may be run by the MNO A (acting as an OpenID server) and at least one of the WLAN gateway or the AAA server at Hotspot B (acting as a Relying Party) to authenticate the user/device. Once the user/device has been successfully authenticated, it may be allowed access to the Hotspot B. For example, in FIG. 6 once the AAA server authenticates the user and sends an indication of successful authentication (e.g., an Access Accept message) to the WLAN gateway at Hotspot B, the user may be allowed access at the Hotspot B. Similarly, in FIG. 7 once the WLAN gateway at Hotspot B authenticates the user/device, then it may be allowed access at the Hotspot B. This authentication may occur seamlessly to the user and/or without the need to pre-provision or install credentials in the device for authentication with the subsequently discovered network (Hotspot B) or manual intervention.

FIG. 6 is a flow diagram illustrating UAM-OpenID integration with an AAA server 617 acting as an RP. As illustrated in FIG. 6, a UE 614, an AP 615, a WLAN GW 616, an AAA server/RP 617, and/or OP server 618 may perform communications to enable UE 614 to authenticate to a wireless network. A local component on the UE 614 (e.g., a CM) may discover a hotspot AP 615 based on its identification information (e.g., an "MNO-WiFi" SSID). The identification information may be discovered via access layer signaling, such as a beacon channel for example. The local component on the UE 614 (e.g., the CM) may decide that the UE 614 should switch to the hotspot and may communicate this command to the application layer of the UE 614. The local component on the UE 614 may send the application-layer network discovery info to an application (e.g., browser) on the UE 614.

As illustrated in FIG. 6, at 601 the UE 614 may associate with the open mode access point (AP) 615. For example, the UE 614 may perform such association and/or open mode access using the identification information (e.g., "MNO-WiFi" SSID) obtained on the access layer. If the UE 614 is configured to get an IP address (e.g., using DHCP) the WLAN Gateway (GW) 616 may allocate a private IP address to the UE 614 at 602. The user may not be able to access the Internet using the private IP address as the state of the UE 614 in the WLAN GW 616 may be set to "unauthorized."

The user may open a web browser application on the UE 614 and at 603 the WLAN GW 616 may receive a request for a webpage (e.g., user homepage) from UE 614. The WLAN GW 616 may redirect the browser on the UE 614 at 604 to a portal page (e.g., IP/URI) that prompts the user for login credentials. The user may enter its OpenID identifier (e.g., URL or email address) on the login page. At 605, the WLAN GW 616 may receive the login credentials from UE 614 and the WLAN GW 616 may use the login credentials received to generate an access request message for the configured AAA server/RP 617. The WLAN GW 616 may send the access request message to the AAA server/RP 617 at 606.

The AAA server 617, acting as an RP, may perform discovery and/or association with OP server 618 at 607 (e.g., using an OpenID protocol). At 608, the AAA server/RP 617 may redirect UE 614 to the OP server 618. The UE 614 may authenticate towards the OP server 618 at 609 (e.g., using OpenID credentials). The OP server 618 may redirect UE 614 to the AAA server/RP 617 at 610 with an authentication assertion. The UE 614 may present the assertion and an indication that it has been successfully authenticated to the AAA server/RP 617 at 611.

At 612, the AAA server/RP may send an indication of successful authentication (e.g., an Access Accept message) to the WLAN GW 616 and/or an indication to change the user/UE 614 status to an "authorized" state in the WLAN GW 616. The WLAN GW 616 may indicate successful authentication to the user/UE 614 by redirecting the user's browser to a start page and enabling the user to access the Internet over the WLAN network at 613.

By integrating OpenID RP functions into AAA server 617, the AAA server 617 may not have to communicate with the HLR/HSS for authentication. Additionally, the user authentication may be secure as the user may be authenticated and/or access the WLAN GW/RP without sending its credentials to the WLAN GW/RP.

FIG. 7 is a flow diagram illustrating UAM-OpenID integration with the WLAN GW 714 acting as an RP. As illustrated in FIG. 7, a UE 712, an AP 713, a WLAN GW/RP 714, and/or OP server 715 may perform communications to enable UE 712 to authenticate to a wireless network to access a service. A local component on the UE 712 (e.g., a CM) may discover a hotspot AP 713 based on its identification information (e.g., an "MNO-WiFi" SSID). The AP 713 may be discovered via access layer signaling, such as a beacon channel for example. The local component on the UE 712 (e.g., the CM) may decide that the UE 712 should switch to the hotspot AP 713 and may communicate this command to the application layer of the UE 712. The local component on the UE 712 may send the application-layer network discovery info to an application (e.g., browser) on the UE 712.

As illustrated in FIG. 7, at 701 the UE 712 may associate with the open mode access point (AP) 713. For example, the UE 712 may perform such association using "MNO-WiFi" SSID and/or open mode access. If the UE 712 is configured to get an IP address using DHCP, the WLAN GW/RP 714 may allocate a private IP address to the UE 712 at 702. The user may not be able to access the Internet using the IP address. At this point, the state of the UE 712 in the WLAN GW/RP 714 may be set to "unauthorized," so it may not be able to access services via the WLAN GW/RP 714.

The user may open a web browser application on the UE 712. At 703, the WLAN GW/RP 714 may receive a request for a webpage (e.g., user homepage) from UE 712. The WLAN GW/RP 714 may redirect the browser on the UE 712 at 704 to a portal page (e.g., IP/URI) that may prompt the user for login credentials. The user may enter its OpenID identifier (e.g., URL or email address) on the login page.

At 705, the WLAN GW/RP 714 may receive the login credentials from UE 712 and the WLAN GW/RP 714 may use the login credentials received to perform discovery and/or association with the OP server 715. At 706, the WLAN GW/RP 714, acting as an RP, may perform discovery and/or association with OP server 715 (e.g., using OpenID protocol). The WLAN GW/RP 714 may redirect the UE 712 at 707 to the OP server 715. The UE 712 may authenticate towards the OP server 715 (e.g., using OpenID credentials) at 708. The OP server 715 may redirect UE 712 to the WLAN GW/RP 714 at 709. The redirect message at 709 may include authentication assertion information. The UE 712 may present the assertion information and/or an indication of successful authentication with the OP server 715 to the WLAN GW/RP 714 at 710. Based on the received assertion information and/or the indication of successful authentication, the WLAN GW/RP 714 may change the user status to an "authorize" state. The WLAN GW/RP 714 may indicate successful authentication to the user/UE 712 by redirecting the browser on the UE 712 to a start page and user may be able to access the Internet over the WLAN network. At 711, the user 712 may be enabled Internet access over the WLAN network.

By integrating OpenID RP functions into a hotspot WLAN GW 714 as illustrated in FIG. 7, a AAA server may not have to be used for authentication. The WLAN GW 714 may not use RADIUS functions. Similar to the embodiment illustrated in FIG. 6, the authentication implementation in FIG. 7 may include secure authentication as the user may be authenticated and/or access the hotspot without sending its credentials to the WLAN GW 714. In the implementation illustrated in FIG. 7, the WLAN service/hotspot provider may reach a large customer base, due to simplified authentication. For example, multiple OPs may be supported by one hotspot, allowing service to be provided to customers from multiple MNOs (e.g., acting as OP server 715), while benefitting from the authentication infrastructure provided by the MNOs.

Also described herein are authentication embodiments that generate credentials (e.g., using reverse boot-strapping) from application-layer credentials for use in a follow-on access-layer or IP-layer authentication in EAP-based public hotspots. At the user level, a user may enter an OpenID identifier to log on to a service, and may be able to access previously unknown access networks, such as a Hotspot B for example, while the service continues seamlessly uninterrupted. The access-layer or IP-layer credentials may not be pre-provisioned at the subsequent access network, since these credentials may be bootstrapped from the already running application service security.

The authentication embodiments described using EAP-based public hotspots may include implementation options for OpenID integration. The implementation options for the OpenID integration with 802.1x/EAP public hotspots may include the use of a hotspot AAA server acting as an RP, the use of a hotspot AAA server acting as an OP, and/or using EAP-OpenID.

Figure 8:
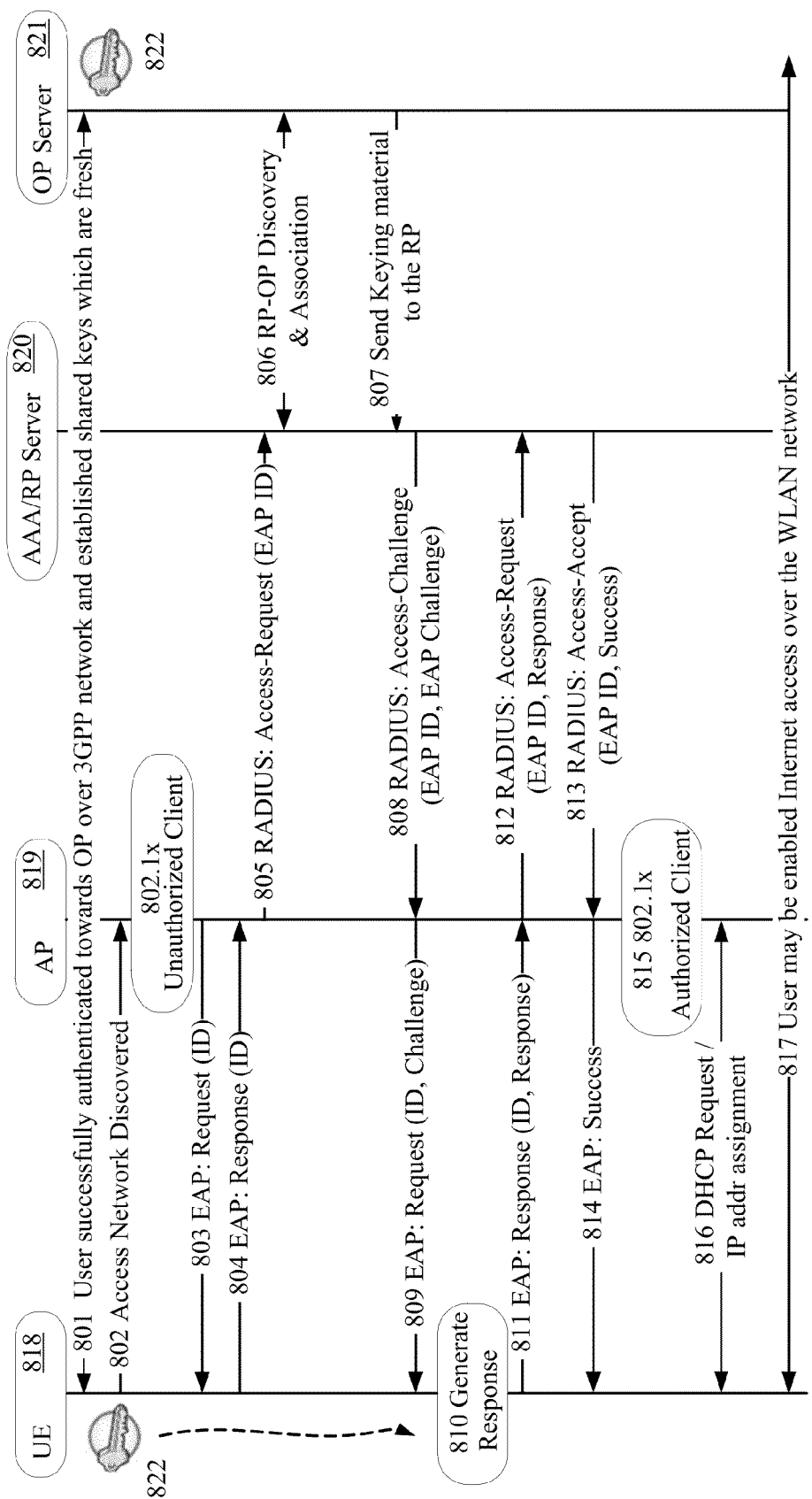
FIG. 8 is a flow diagram illustrating an Extensible Authentication Protocol (EAP)-OpenID integration with an AAA server acting as an RP.

FIG. 8 is a flow diagram illustrating EAP-OpenID integration with the AAA server 820 acting as an RP. The integration of the RP function into a hotspot AAA service may enable support of seamless authentication and/or service continuity, such as between 3GPP and WLAN networks for example. A user may be seamlessly authenticated in a public hotspot that integrates RP module into the AAA server 820 by: leveraging keys derived on the UE 818 and/or an OP server 821 to complete EAP-SIM/AKA authentication, using an active connection (e.g., 3GPP connection) to exchange OpenID authentication, and/or enabling a hotspot AP 819 to allow UE-OpenID exchanges.

As illustrated in FIG. 8, UE 818 and/or its user may be authenticated using communications between a UE 818, an AP 819, an AAA/RP server 820 and/or an OP server 821. The UE 818, the AAA/RP server 820, and/or the OP server 821 may each include an application capable of communicating at the application layer. The UE 818, the AP 819, and/or the AAA/RP server 820 may each include an IP-layer communication module capable of communicating at the IP layer. The UE 818 and/or the AAA/RP server 820 may be configured to enable communications between its application and IP-layer communication module. The OpenID Identity Provider (OP) may be the MNO or an Application Service Provider associated with the MNO for example. The OP server 821 may serve multiple MNOs, allowing for a broad customer base to use hotspots. The AAA Server 820 may be implemented as an RP and may leverage keys 822 (e.g., derived at the application layer) on a UE 818 and/or an OP server 821. According to an example embodiment, the application-layer keys 822 may be leveraged to complete EAP-SIM/AKA authentication.

As illustrated in FIG. 8, at 801 the UE 818 may successfully complete authentication towards the OP server 821 via access network communications (e.g., 3GPP access network communications). The UE 818 and the OP server 821 may establish shared keys 822 at 801. The shared keys 822 may be application-layer credentials established at the application layer between the UE 818 and the OP server 821 for example. A local component on the UE 818 (e.g., a connection manager (CM)) may discover the AP 819 based on its identification information, such as an "MNO-WiFi" SSID for example, at 802. The identification information of the AP 819 may be discovered via access layer signaling, such as a beacon channel for example. The UE 818 (e.g., implementing the CM)

may decide that it should switch to the AP 819 for accessing services. The UE 818 may be an unauthorized client of the AP 819 network.

The AP 819 (e.g., authenticator) may issue an EAP request at 803 asking for the identity of the UE 818. At 804, the UE 818 may return an identifier, such as its permanent identity (e.g., international mobile subscriber identity (IMSI)), a pseudonym identity, a fast authentication identity, or other similar identifier of the UE 818 for example. The access-layer identifier may be returned with additional authentication information, such as its realm for example. The realm may include additional information for use in performing authentication, such as a hint to use a single sign-on (SSO) authentication (e.g., IMSI@sso.MNO.com) for example.

The AP 819 may send the access-layer identifier to AAA/RP server 820 at 805. The access-layer identifier, and other communications between the AP 819 and the AAA/RP server 820, may be sent using a RADIUS access request, access challenge, and/or access accept messages for example. The AAA/RP server 820 may send the access-layer identifier to the application layer on the AAA/RP Server 820. Based on the access-layer identifier and/or operator policy, the RP function of the AAA server 820 may perform discovery and/or association with OP server 821 at 806. The discovery and/or association may be performed using OpenID protocol for example. During discovery and/or association at 806, the AAA/RP server 820 may send the access-layer identifier to the OP server 821. For example, the access-layer identifier may be sent at the application layer between the AAA/RP server 820 and the OP server 821. The OP server 821 may use the access-layer identifier and/or the application-layer credential 822 to generate keying material that may be used to authenticate the UE 818 at the AAA/RP server 820. For example, the OP server 821 may use the access-layer identifier to determine the application-layer credential 822 associated with the UE 818. The keying material may be derived from the application-layer credential 822 using a key derivation function. According to an example embodiment, the keying material may include a session key that may be used for authentication between the UE 818 and the AAA/RP server 820. The OP server 821 may send keying material to the AAA/RP server 820 at 807.

The AAA/RP server 820 may use the keying material received from the OP server 821 to send an EAP-SIM/AKA challenge to the UE 818. The EAP-SIM/AKA challenge may be sent to enable a re-authentication procedure, without having to interface or communicate with the HLR/HSS for example. At 808, the AAA/RP server 820 may send the access challenge to the AP 819. The access challenge may include the identifier associated with the UE 818 and/or the keying material received at 807. The AP 819 may send the EAP message received from the AAA/RP server 820 (e.g., EAP-request/challenge) to the UE 818 at 809 via the radio access network. After receiving the EAP-request/challenge message, the UE 818 may check the keying material to validate the message and generate an EAP response at 810 using the application-layer credential 822. For example, the UE 818 may send the challenge to a trusted environment residing on the UE 818 (e.g., trusted processing module, UICC, SIM, smartcard, etc.) which may derive keying material from the application-layer credential 822 using a key derivation function. The keying material may be the same keying material generated at the OP server 821 using the application-layer credential. For example, the keying material may include a session key that may be used for authentication between the UE 818 and the AAA/RP server 820. The keying material may be used to generate the response at 810. The response may be generated at the application layer of the UE 818 and transmitted to the access-layer for transmission to the AP 819.

The UE 818 may return the response in the form of an EAP-response message to the AP 819 at 811 using a re-authentication procedure for example. The response may include the UE identifier and/or the keying material (e.g., session key) generated at the UE 818. The AP 819 may forward the EAP-response/challenge message to the AAA/RP server 820 at 812, such as in the form of an access request message for example. The access request at 812 may include the EAP ID and/or the keying material from the UE 818 at 811. The AAA/RP server 820 may validate the message received and/or check whether the response received matches the expected response at 812 and, if the checks are successful, the AAA/RP server 820 may indicate successful authentication and/or that the UE 818 may access services using the WLAN network. For example, the AAA/RP 820 may send an access accept message to the AP 819 at 813. The Access Accept message may include an EAP success indicator and/or the keying material. The AP 819 may forward the EAP success indicator to the UE 818 at 814. At 815, the status of the UE 818 at the AP 819 may become authorized for use of the AP 819. As the UE 818 is authorized, the UE 818 may obtain an IP address using DHCP at 816. The UE 818 may access the Internet over the WLAN network at 817 using the IP address for example.

Using the call flow illustrated in FIG. 8, or portions thereof, the hotspot AAA server 820 may not have to connect to an MNO HLR/HSS to perform authentication using the EAP protocol. For example, by using OpenID as described herein, the AAA server 820, or other RP entity for example, may avoid communication with an HLR/HSS, or other SS7 entity for example, for performing user authentication. Instead, the AAA server 820 may communicate with an internet protocol (IP)-based HTTP(S) interface, such as the IP-based HTTP(S) interface for OpenID for example.

Figure 9:
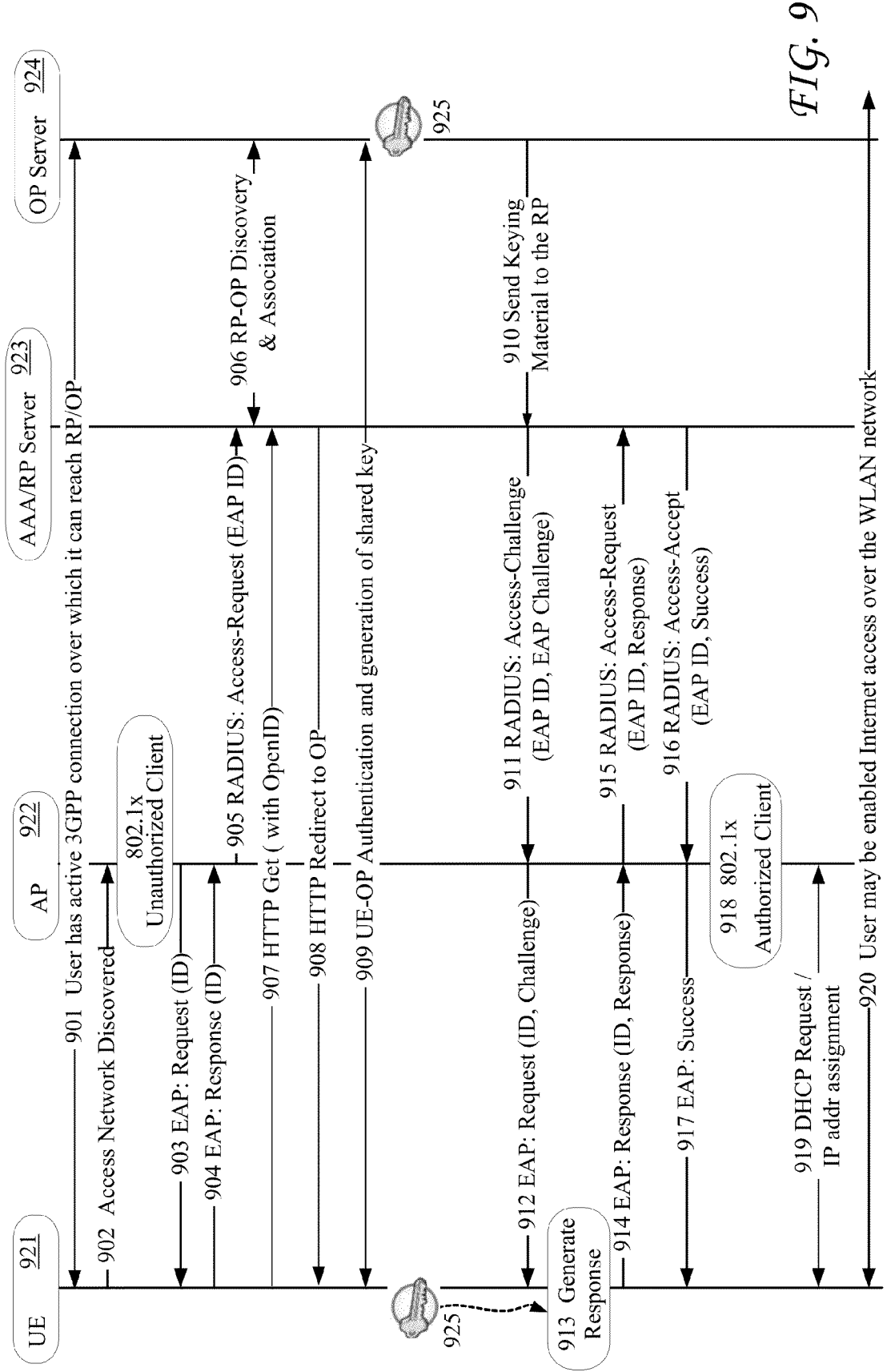
FIG. 9 is another flow diagram illustrating EAP-OpenID integration with an AAA server acting as an RP.

FIG. 9 is another flow diagram illustrating EAP-OpenID integration with the AAA server 923 acting as an RP. As illustrated in FIG. 9, UE 921 and/or its user may be authenticated for communication on a WLAN using communications between a UE 921, an AP 922, an AAA/RP server 923, and/or an OP server 924. The UE 921, the AAA/RP server 923, and/or the OP server 924 may each include an application capable of communicating at the application layer. The UE 921, the AP 922, and/or the AAA/RP server 923 may each include an IP-layer communication module capable of communicating at the IP layer. The UE 921 and/or the AAA/RP server 923 may each be configured to enable communications between their application and IP-layer communication module. According to an example embodiment, the AP 922 may be configured to allow OpenID exchanges for an unauthorized UE 921 in which the UE 921 may be able to reach and communicate with the AAA/RP server 923 and/or OP server 924 via the AP 922.

In the embodiment illustrated in FIG. 9, there may not be fresh keys that have been previously shared between the UE 921 and OP server 924, as illustrated in FIG. 8 for example. Thus, the UE 921 and/or OP server 924 may perform authentication and generation of an application-layer identity key 925. The AAA server 923 may be acting as an RP and may use a connection (e.g., 3GPP connection) to perform OpenID authentication. The UE 921 may be a device that is able to establish a connection with multiple networks simultaneously (e.g., UE 921 may be a multi-RAT device capable of establishing a connection via 3GPP networks and via WLAN hotspots simultaneously). As illustrated in FIG. 9, an established 3GPP connection may be used to exchange OpenID messages and complete the EAP-SIM/AKA authentication. While FIG. 9 uses credentials established in an active 3GPP connection to perform authentication for communication over a WLAN, it will be understood that other forms of wireless connections may be used in a similar manner to perform authentication as illustrated in FIG. 9.

At 901, a UE 921 may have an active 3GPP connection established and it may reach AAA/RP server 923 and/or OP server 924 over this connection. According to another example embodiment, the AP 922 may allow OpenID exchanges for authentication of the UE 921, rather than using the 3GPP connection established at 901. In either embodiment, the protocol flow may be the same, or similar, to that illustrated in FIG. 9. Continuing with the protocol flow of FIG. 9, a local component on the UE 921 (e.g., a CM) may discover the AP 922 at 902, and/or its identification information, such as an "MNO-WiFi" SSID for example. AP 922 may be discovered via access layer signaling, such as a beacon channel for example. The local component on the UE 921 (e.g., CM) may decide that the UE 921 should connect to the AP 922. The UE 921 may be an unauthorized client at the AP 922 and may not have access over the network.

At 903, the AP 922 (e.g., authenticator) may issue an EAP request asking for the IP-layer identity of the UE 921. The UE 921 may return its IP-layer identity via an EAP response at 904. The IP-layer identity of the UE 921 may include its international mobile subscriber identity (IMSI) and/or additional authentication information. The additional information may include the realm of the UE 921 for example. The realm may include additional authentication information, such as a hint to use SSO authentication (e.g., IMSI@sso.MNO.com) for example. The AP 922 may send the IP-layer identity (EAP ID) to the AAA/RP server 923 at 905. The IP-layer identity, as well as other communications between the AP 922 and AAA/RP server 923, may be sent using RADIUS access messages, such as RADIUS access request messages, RADIUS access challenge messages, and/or RADIUS access accept messages for example.

The AAA/RP server 923 may discover and perform association with OP server 924 at 906. For example, the RP function of the AAA server 923 may perform discovery and association with OP server 924 using OpenID protocol. An application on UE 921 may send a login request at 907 to the AAA/RP server 924 which may act as a Relying Party (RP). The login request at 907 may be sent over a 3GPP connection with OpenID for example. The application on the UE 921 may send the login request based on an indication to initiate the communication from a local entity (e.g., the CM) on the UE 921. Communicating with the UE 921 over a 3GPP wireless connection, the AAA/RP server 923 may redirect the UE 921 to the OP server 924 at 908.

The UE 921 may authenticate (e.g., using OpenID credentials) with the OP server 924 at 909 over the 3GPP connection. For example, the UE may authenticate with the OP using OpenID credentials. Upon successful completion of authentication towards the OP server 924, application-layer credentials 925 may be established on the UE 921 and/or OP server 924. The OP server 924 may generate keying material based on the application-layer credential 925. The keying material may be used for authentication between the UE 921 and the AAA/RP server 923. The keying material may be derived from the application-layer credential 925 using a key derivation function. According to an example embodiment, the keying material may include a session key used for authentication using the AAA/RP server.

The OP server 924 may send the keying material based on the application-layer credential 925 to the AAA/RP server 923 at 910. The AAA/RP server 923 may receive the keying material at the application layer and communicate the keying material to its IP-layer communication module for transmitting to the AP 922. The AAA/RP server 923 may use the keying material to send an EAP-SIM/AKA challenge to the UE 921, via the AP 922, at 911. The challenge may be based on a re-authentication procedure, wherein the AAA/RP server 923 may perform authentication without having to communicate with the HLR/HSS for example. The challenge at 911 may include the EAP ID and/or the keying material received at 910. The AP 922 may receive the challenge at 911 and send the EAP message (EAP-request/challenge message) received from the AAA/RP server 923 to the UE 921 at 912.

After receiving the EAP-request/challenge message at 912, the UE 921 may generate a response using the application-layer credential 925 at 913. The UE 921 may check the keying material received from the AAA/RP server and may send the challenge to a trusted environment (e.g., trusted processing module, UICC, SIM, smartcard, etc.) that uses the application-layer credential 925 to generate the response. For example, the trusted environment on the UE 921 may derive the keying material from the application-layer credential 925 using a key derivation function. The keying material may be the same keying material generated at the OP server 924 using the application-layer credential 925. For example, the keying material may include a session key that may be used for authentication between the UE 921 and the AAA/RP server 923. The keying material may be used to generate the response at 913. The response may be generated at the application layer of the UE 921 and transmitted to the access-layer for transmission to the AP 922.

The UE 921 may return the response at 914 in an EAP-response message to the AP 922 based on a re-authentication procedure. The EAP-response message may include the IP-layer identifier and/or the keying material generated from the application-layer credential 925. The AP 922 may forward the EAP-response/challenge message to the AAA/RP server 923 at 915. The AAA/RP server 923 may authenticate the UE 921 by checking the keying material in the EAP-response/challenge message and, if the check is successful, the AAA/RP server 923 may enable the UE 921 to access services over the WLAN network. For example, the AAA/RP server 923 may send an access accept message including an EAP success and the keying material to the AP 922 at 916. The EAP success message may be forwarded to the UE 921 at 917. At 918, the status of the UE 921 may become authorized on the AP 922. The UE 921 may obtain an IP address from the AP 922 at 919 using DHCP for example, and may access the Internet over the WLAN network at 920.

OpenID is used herein to create the shared credential (e.g. application-layer credential 925) between the UE 921 and the OP server 924. The application-layer credential 925 may be used for authentication of the user/UE 921 at the AAA/RP server 923. The embodiments illustrated in FIG. 9 enable the UE 921 to authenticate towards the OP server 924 and share the secret 925. Authentication between the UE 921 and the OP server 924 enable application-layer credential 925 to be generated upon successful authentication between the UE 921 and OP server 924 (e.g., using OpenID-AKA). The OP server 924 may then use the application-layer credential 925 to sign the assertion which is sent to the AAA/RP server 923 at 910 and then verified by the AAA/RP server 923 using the application-layer credential 925. Upon secret key 925 generation between OP server 924 and UE 921, as part of the OpenID procedures for example, another network entity may be used to deliver the EAP credentials (e.g., keying material) to UE 921 (e.g., to the CM on the UE 921).

Again, using the protocol flow illustrated in FIG. 9, or portions thereof, the hotspot AAA server 923 may not have to connect to an MNO HLR/HSS to perform authentication using the EAP protocol. Instead, the AAA server 923 may communicate with a simple internet protocol (IP)-based HTTP(S) interface, such as the IP-based HTTP(S) interface for OpenID for example. Hotspot AP 922 may allow OpenID exchanges in addition to AP messages or unauthenticated devices.

Figure 10:
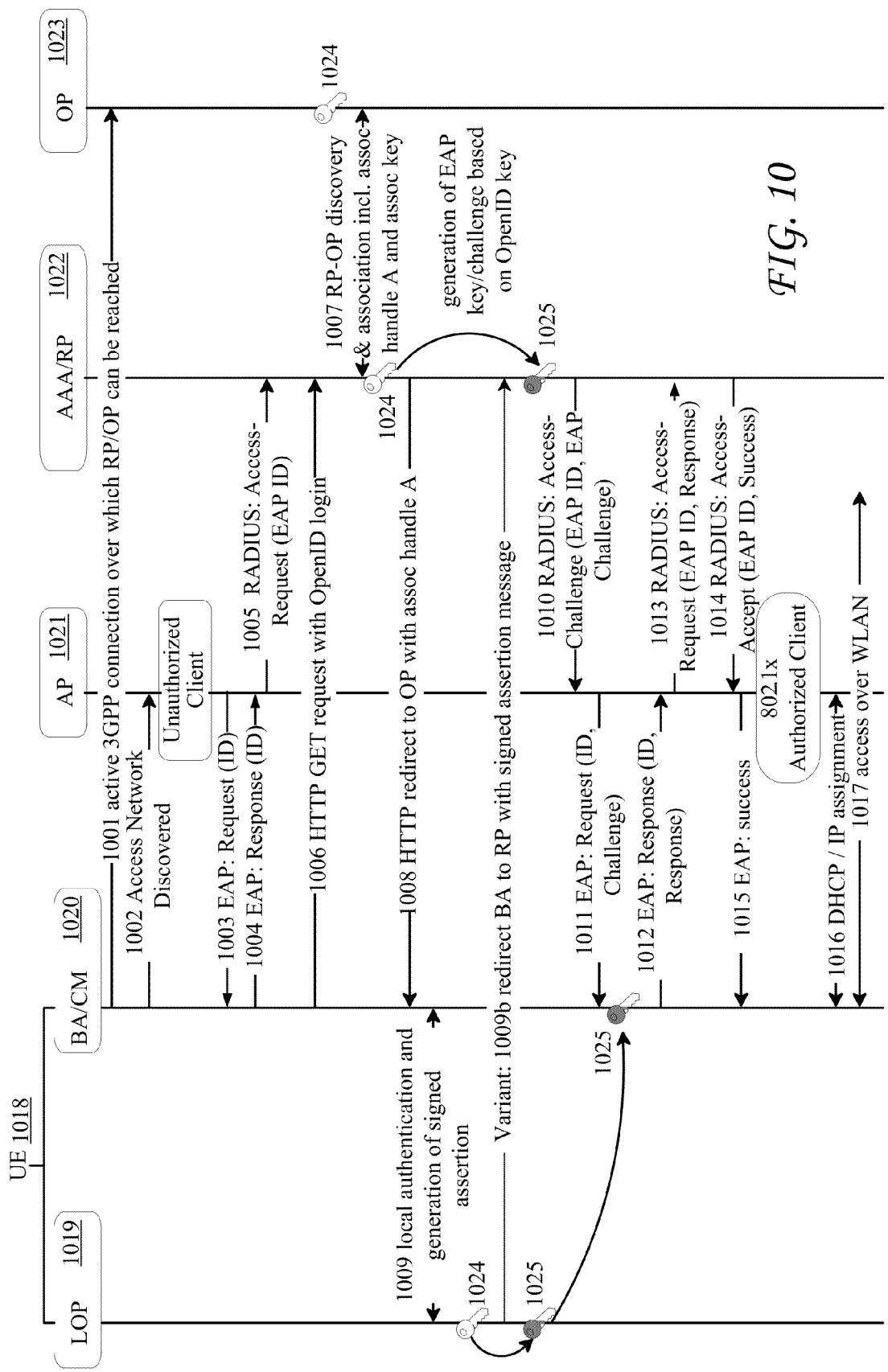
FIG. 10 is a flow diagram illustrating EAP-OpenID integration with an AAA server acting as an RP and implementation of a local OpenID provider (local OP)

FIG. 10 is a flow diagram illustrating EAP-OpenID integration with the AAA server 1022 acting as an RP and implementation of a local OpenID provider (local OP). As illustrated in FIG. 10, UE 1018 and/or its user may be authenticated using communications between the UE 1018, an AP 1021, an AAA/RP server 1022 and/or an OP server 1023. As illustrated in FIG. 10, a UE 1018 may include a local OP 1019 and a browsing agent (BA)/connection manager (CM) 1020, each configured to communicate with each other and/or other network entities to perform authentication and gain access to services. While the BA/CM 1020 is illustrated in FIG. 10 as a single entity, the BA and the CM may be separate entities that perform independent functions within the UE 1018. The local OP 1019 may be installed on the UE 1018 within a secure environment (e.g., trusted processing module, UICC, SIM, smartcard, etc.). The local OP 1019 may act as an OP server for the UE 1018. The local OP 1019 may include a long term secret 1024 which may be shared with the OP server 1023 on the network. The local OP 1019 may create and/or sign identity assertions after a successful local user authentication.

At 1001, the UE 1018 may have an active 3GPP connection and may reach AAA/RP 1022 and/or OP server 1023 over this connection (e.g., via BA/CM 1020). While authentication and service continuity may be established between a 3GPP and a WLAN connection in FIG. 10, it will be recognized that similar communications may be used for authentication and service continuity between other networks. The BA/CM 1020 may discover the AP 1021 (e.g., at the access network) and/or its identification information at 1002. At this point, the UE 1018 may be an unauthorized client on the WLAN network. The identification information of the AP 1021 may include an "MNO-WiFi" SSID. The AP 1023 and/or its identification information may be discovered via access layer signaling, such as a beacon channel for example. The BA/CM 1020 may decide that the UE 1018 should connect to the AP 1021. At 1003, the AP 1021 (e.g., authenticator) may issue an EAP request asking for a UE 1018 identity. The UE 1018 may return its IP-layer identity at 1004. The UE 1018 IP-layer identity may include an international mobile subscriber identity (IMSI) and/or additional authentication information, such as its realm for example. The realm may include a hint to use SSO authentication (e.g., IMSI@sso.MNO.com) for example.

The AP 1021 may send the EAP ID (e.g., IP-layer identity) to AAA/RP server 1022 at 1005. The BA/CM 1020 on the UE 1018 may send an HTTP GET request to the AAA/RP 1022 with the OpenID identity at 1006. The RP function of the AAA server 1022 may perform discovery and/or association with OP server 1023 at 1007. As a result, an association key 1024 and/or association handle may be created and shared between OP server 1023 and AAA/RP server 1022. According to an example embodiment, the OP server 1023 may receive the access-layer identity associated with the UE 1018 and send the association key 1024 and/or association handle to the AAA/RP server 1022 at the application layer. The AAA/RP server 1022 may derive an EAP key 1025 and/or challenge from this association key 1024. For example, the EAP key 1025 may be derived from the association key 1024 using a key derivation function or a reverse bootstrapping procedure. The AAA/RP server 1022 may redirect the UE 1018 to the local OP 1019 at 1008 for authentication. This redirect message to the local OP 1019 from the AAA/RP 1022 may include the association handle, but may not include the association key 1024.

The UE 1018 and/or BA/CM 1020 may authenticate locally with the local OP 1019 and/or generate a signed assertion at 1009. The UE 1018 may derive the local assertion key 1024 from the association handle and use the assertion key 1024 to sign the assertion. The redirect request to the local OP 1019 may include the association handle, which the local OP 1019 may use to derive the same signature key 1024 as is shared between OP server 1023 and AAA/RP server 1022. Upon successful completion of authentication, the signed assertion message may be created by the local OP 1019. The local OP 1019 may also derive the same EAP key 1025 as the AAA/RP server 1022 generated at 1007. In a variation to step 1009, to complete an OpenID protocol run, the local OP 1019 may redirect the BA/CM 1020 to the AAA/RP server 1022 at 1009(b) with the signed assertion message for verification. The local OP 1019 and network OP server 1023 may share a long term secret 1024 which may be used to derive the signature key 1025.

The AAA/RP server 1022 may generate an EAP challenge based on the generated EAP key 1025. The EAP challenge may be an EAP-SIM/AKA challenge and may be sent to the UE 1018 without having to communicate with the HLR/HSS. For example, the AP 1021 may receive the access challenge from the AAA/RP 1022 at 1010 and send the EAP request at 1011 to the BA/CM 1020 on the UE 1018. The access challenge and the EAP request may include the EAP identity and/or the EAP challenge. After receiving the EAP-request/challenge message, the UE 1018 may validate the message and/or generate a response using the EAP key 1025. For example, the UE 1018 may send the challenge to the secure environment on the UE 1018 (e.g., trusted processing module, UICC, SIM, smartcard, etc.) that may use the EAP key 1025 to generate the EAP response.

The UE 1018 may return an EAP response at 1012 to the AP 1021. The EAP response may include the EAP identity and/or the EAP key 1025 generated from the shared key 1025. At 1013, the AP 1021 may forward the EAP-response/challenge message to the AAA/RP server 1022. The AAA/RP server may validate the message and compare the received response with the expected response based on the derived EAP key 1025. When the authentication checks performed at the AAA/RP server 1022 are successful, the AAA/RP server 1022 may send an indication of successful authentication to the AP 1021 at 1014. For example, the AAA/RP server 1022 may send an access accept message including an EAP success and the keying material to the AP 1021. The indication of successful authentication may be forwarded to the UE 1018 at 1015. After successful authentication has been performed, the status of the UE 1018 may become authorized for communication on the AP 1021. The UE 1018 may obtain an IP address at 1016 (e.g., using DHCP) and may access the Internet over the WLAN using AP 1021 at 1017.

Using the protocol flow illustrated in FIG. 10, or portions thereof, the hotspot AAA server 1022 may not have to connect to an MNO HLR/HSS to perform authentication using the EAP protocol. Additionally, the use of the local OP 1019 enables the UE 1018 to perform local key generation for the EAP process, as well as local authentication of the user.

Figure 11:
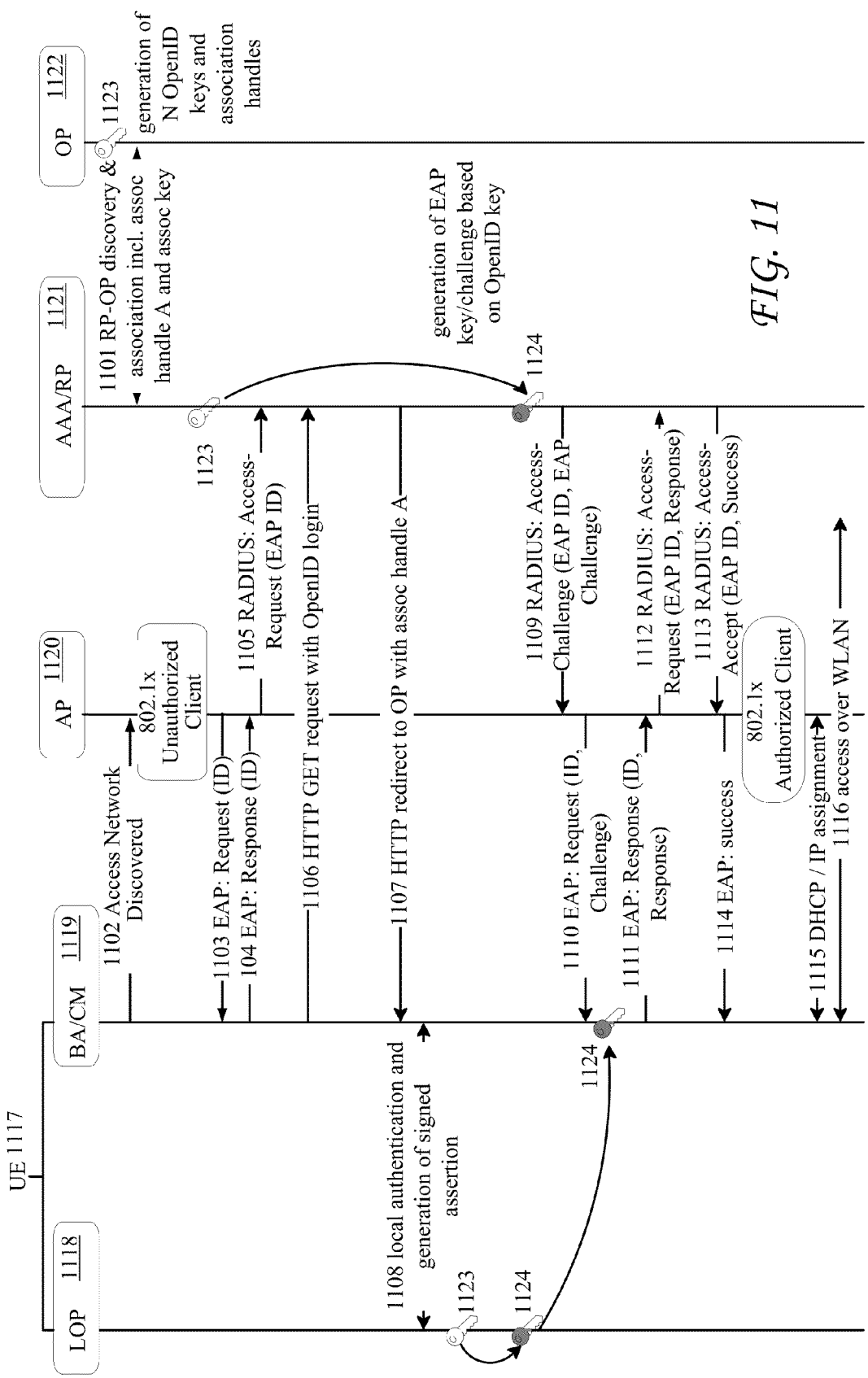
FIG. 11 is another flow diagram illustrating EAP-OpenID integration with an AAA server acting as an RP.

FIG. 11 is another flow diagram illustrating EAP-OpenID integration with the AAA server 1121 acting as an RP. The AAA/RP 1121 may initiate pre-fetch associations with known OP servers prior to a request for services from the UE 1018. As illustrated in FIG. 11, UE 1117 and/or its user may be authenticated for access to the services using communications between the UE 1117, an AP 1120, an AAA/RP server 1121 and/or an OP server 1122. According to the example embodiment illustrated in FIG. 11, the UE 1117 may use the local OP 1118 to perform local authentication and key generation for EAP keys 1124 from OpenID signature keys 1123 on the UE 1117. Additionally, the embodiments illustrated in FIG. 11 may use the identifier select mode of OpenID to set up associations between the AAA/RP server 1121 and OP server 1122 before the UE 1117 authenticates towards the AAA/RP server 1121. This may enable the avoidance of OP discovery by having an association between the OP server 1122 and the AAA/RP server 1121 pre-established. This may result in reducing the time for completing SSO procedure when a UE, such as UE 1117 for example, moves to an access network and enable networks handoff to be seamless to the user.

According to an example embodiment, the AAA/RP server 1121 may initiate multiple associations with known OP servers, such as OP server 1122 for example. The AAA/RP server 1121 may initiate such associations using an identifier select mode of OpenID (where the provider URL may be used instead of the full identifier URL, which may be completed by the local OP 1118 later on) for example. The AAA/RP server 1121 may store the association handles and association secrets that it obtained from the OP servers. One of the discoveries and associations performed by the AAA/RP server 1121 may include the discovery and association with OP server 1121 at 1101. The AAA/RP 1121 may store the association handle and/or the association secret 1123 received from the OP server 1122.

At 1102, a local component on the UE, such as the BA/CM 1119 for example, may discover the AP 1120 based on its identification information. The AP 1120 may be identified via the access layer signaling for example. At this point, the UE 1117 may be an unauthorized client on the network associated with the AP 1120 (e.g., WLAN). The BA/CM 1119 may decide that the UE 1117 should connect to the AP 1120. At 1103, the AP 1120 may request the IP-layer identity of the UE 1117. The UE 1117 may return its IP-layer identity and/or additional authentication information to the AP 1120 at 1104. The AP 1120 may send the IP-layer identifier of the UE 1117 to AAA/RP server 1121 at 1105.

The BA/CM 1119 on the UE 1117 may send a request to the AAA/RP 1121 at 1106 with the OpenID provider URL, email address, or other login identifier (e.g., in identifier select mode). The AAA/RP server 1121 may select one of the pre-established association handles and association keys. For example, the AAA/RP server 1121 may select the association handle and association key 1123 that has been pre-established with OP server 1122 based on the login identifier received from the UE 1117. AAA/RP server 1121 may derive an EAP key 1124 and/or EAP challenge from this association key 1123. The EAP key 1124 may be derived from the association key 1123 using a key derivation function or a reverse bootstrap procedure for example. The AAA/RP 1121 may redirect the UE 1117 at 1107 to the local OP 1118 for authentication. Since a local OP 1118 is deployed, the authentication may be redirected to the local OP 1118. This redirection to the local OP 1118 may include the association handle, but may not include the association secret 1123.

The UE 1117 and/or the BA/CM 1119 may authenticate locally with the local OP 1118 at 1108. The redirect request to the local OP 1118 may include the association handle, which the local OP 1118 may use to derive the association key 1123 that is shared between OP server 1122 and AAA/RP 1121. The local OP 1118 and network OP server 1122 may share a long term secret which may be used to derive the signature key 1123. Upon successful completion of authentication, the local OP 1118 may derive the EAP key 1124 from the signature key 1123 that is also derived at the AAA/RP server 1121. The EAP key may be derived using a key derivation function for example. The local OP 1118 may use the EAP key 1124 to generate a signed assertion message for sending to the AAA/RP server 1121.

The AAA/RP 1121 may generate an EAP challenge based on the generated EAP key 1124 and may send the EAP challenge to the UE 1117 without having to communicate with the HLR/HSS. For example, the access challenge may be sent from the AAA/RP 1121 to the AP 1120 at 1109. The access challenge may include the EAP ID and/or the challenge. The AP 1120 may send the EAP message (EAP-request/challenge) received from the AAA/RP server 1121 to the BA/CM 1119 at 1110.

After receiving the EAP-request/challenge message, the UE 1118 may validate the message and generate a response using the EAP key 1124. The UE 1118 may send the EAP challenge to a trusted environment (e.g., trusted processing module, UICC, SIM, smartcard, etc.) that may use the EAP key 1124 to generate the EAP response. The UE 1117 may return a response message to the AP 1120 at 1111. The response message may include the EAP ID and/or the EAP response. At 1112, the AP 1120 forwards the EAP-response/challenge message to the AAA/RP server 1121. The AAA/RP may perform authentication using the EAP key 1124. When the authentication checks performed at the AAA/RP server 1121 are successful, the AAA/RP server 1121 may send an indication of successful authentication at 1113. For example, the AAA/RP server 1121 may send a message indicating successful authentication to the AP 1120. For example, the indication of successful authentication may include an EAP success and the keying material. The indication of successful authentication may be forwarded to the UE 1117 at 1114. After successful authentication has been performed, the UE 1117 status may become authorized on the AP 1120. The UE 1117 may obtain an IP address for communication on the AP 1120 (e.g., using DHCP) at 1115 and may access the Internet at 1116 using the AP 1120.

Figure 12:
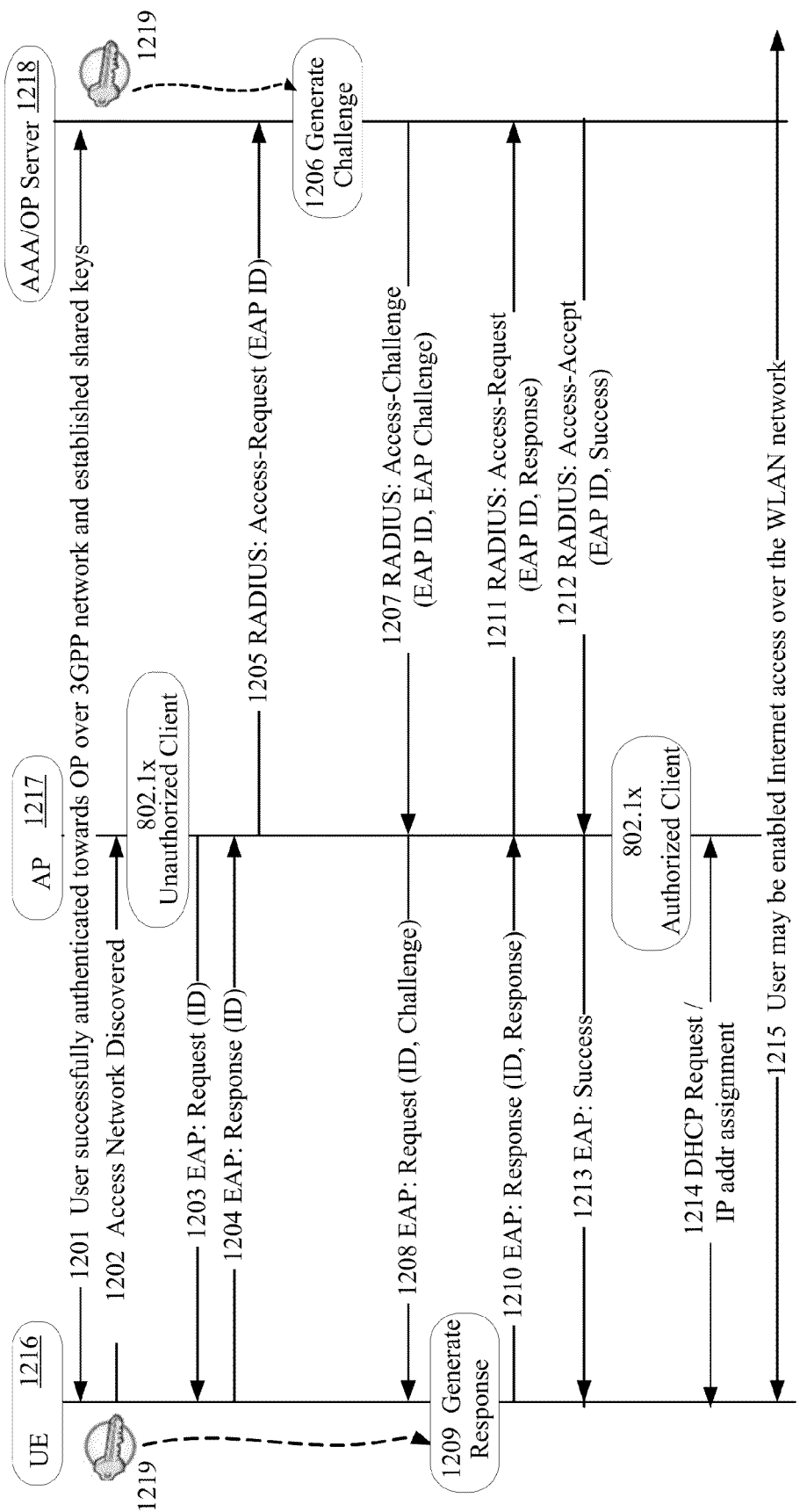
FIG. 12 is a flow diagram illustrating an authentication protocol that implements an AAA server as an OP server.

FIG. 12 is a flow diagram illustrating an authentication protocol that implements an AAA server 1218 as the OP server. The flow diagram illustrated in FIG. 12 may be implemented using a UE 1216, an AP 1217, and an AAA/OP server 1218. The AP 1217 may be a hotspot or other node capable of communicating over a WLAN network for example. The integration of the OP server functionality into a hotspot AAA service may enable support of seamless authentication and/or service continuity between networks, such as between 3GPP and WLAN networks for example. The AAA/OP server 1218 may use previously generated keys 1219 on UE 1216 and/or the AAA/OP server 1218 to perform authentication for accessing services over the WLAN network. According to an example embodiment, the previously generated keys 1219 may be application-layer credentials. While FIG. 12 describes network communications for seamless authentication and/or service continuity between 3GPP and WLAN networks, it will be understood that similar communications may be used for seamless authentication and service continuity between other types of wireless networks.

As described herein, a user may be seamlessly authenticated at a public hotspot (e.g., AP 1217) with an OP module that is integrated into the AAA server 1218. According to an embodiment, authentication may be performed using the AAA/OP server 1218 to leverage keys 1219 derived on UE 1216 and/or AAA/OP server 1218 to complete authentication (e.g., EAP-SIM/AKA authentication). An active 3GPP connection may be used to exchange authentication messages (e.g., OpenID authentication messages) for authentication at the WLAN network.

As illustrated in FIG. 12, the UE 1216 may successfully completed authentication towards the AAA/OP server 1218 at 1201 over a 3GPP access network. Shared keys 1219 may be established on the UE 1216 and/or the AAA/OP server 1218 during the authentication protocol over the 3GPP access network. At 1202 a local component on the UE (e.g., a CM) may discover the AP 1217 based on its identification information. For example, the identification information of the AP 1217 may be an "MNO-WiFi" SSID. The AP 1217 may be discovered via access layer signaling, such as a beacon channel for example. The local component on the UE 1216 (e.g., the CM) may decide that the UE 1216 should switch to the hotspot.

The AP 1217 (e.g., authenticator) may issue an EAP request at 1203 asking for UE 1216's IP-layer identity. The UE 1216 may return its IP-layer identity and/or additional authentication information to AP 1217 at 1204. For example, the UE 1216 may return its international mobile subscriber identity (IMSI). The additional authentication information may include the realm. The realm includes a hint to use SSO authentication (e.g., IMSI@sso.MNO.com). According to an example embodiment, the UE 1216 may provide additional information to aid in discovery of the UE 1216 authentication capabilities, such as by pre-pending a bit (e.g., a '0' or a '1') to the IMSI to hint to the server to use EAP-AKA or EAP-SIM procedures respectively.

The AP 1217 may send the EAP ID (e.g., access-layer identity) to AAA/OP server 1218 at 1205. The OP function of the AAA server 1218 may generate a challenge at 1206 based on previously generated key 1219 shared with the UE 1216. For example, the AAA/OP server 1218 may derive a session key for use in authentication at the access-layer. The session key may be derived using a key derivation function or a generic bootstrap procedure for example. The AAA/OP server 1218 may use a re-authentication procedure to send the challenge to the UE 1216 in EAP-SIM/AKA challenge message. For example, the AP 1217 may receive an EAP message that includes the session key generated from the shared key 1219 and/or the EAP ID from the AAA/OP server 1218 at 1207. The AP 1217 may then forward the EAP message received from the AAA/OP server (EAP-Request/Challenge) to the UE 1216 at 1208.

After receiving the EAP-request/challenge message, the UE 1216 may perform authentication using the session key. The UE 1216 may send the challenge to a secure environment resident thereon (e.g., trusted processing module, UICC, SIM, smartcard, etc.) which may use the shared key 1219 with the AAA/OP server 1218 to generate the EAP response at 1209. For example, the EAP response message may include a response generated from the shared key 1219.

The UE 1216 may return an EAP message to the AP 1217 at 1210 in response to the AP 1217 based on a re-authentication procedure. The EAP message may include the EAP ID and/or the response generated using the shared key 1219. At 1211, the AP 1217 may forward the EAP-response/challenge message to the AAA/OP server 1218. The AAA/OP server may validate the message and/or compare the response received in the EAP-response/challenge message with the expected response. When the checks performed at the AAA/OP server 1218 are successful, the AAA/OP server 1218 may send an indication of successful authentication to the UE 1216 via the AP 1217. For example, the AAA/OP server 1218 may send an access accept message at 1212 including an EAP success and/or the key material to the AP 1217. The EAP success message may be forwarded to the UE 1216 at 1213. Upon successful authentication, the UE 1216 status may become authorized on the AP 1217. The UE 1216 may obtain an IP address (e.g. using DHCP) from the AP 1217 at 1214 and may access the Internet over the WLAN network at 1215.

As described herein, a shared credential 1219 may be generated between the UE 1216 and the AAA/OP server 1218. The shared credential may be established during or after authentication at another network for example. The UE 1216 may authenticate towards the AAA/OP server 1218, which may use the shared credential 1219 to sign an assertion which is sent to an RP and then verified by the RP using the shared credential 1219. The authentication between UE 1216 and AAA/OP 1218 may generate the shared credential 1219 upon successful authentication (e.g., using OpenID-AKA). Upon shared credential 1219 generation between AAA/OP 1218 and UE 1216, another entity may deliver the EAP credentials to the UE 1216 (e.g., at the CM).

The embodiments described herein may eliminate the implementation of complex MAP/Diameter interface on a hotspot AAA server or to interface and communicate with the MNO HLR/HSS for AV fetching. Additionally, seamless authentication and service continuity between 3GPP and WLAN hotspots may be enabled. As illustrated in FIG. 12, an OP module may be implemented in a hotspot AAA server 1218. As an alternative to, or in addition to, integrating OP into hotspot AAA server, OP functionality may be implemented into MNO AAA server and hotspot AAA server may act as an AAA proxy that relays requests to the MNO AAA server.

Figure 13:
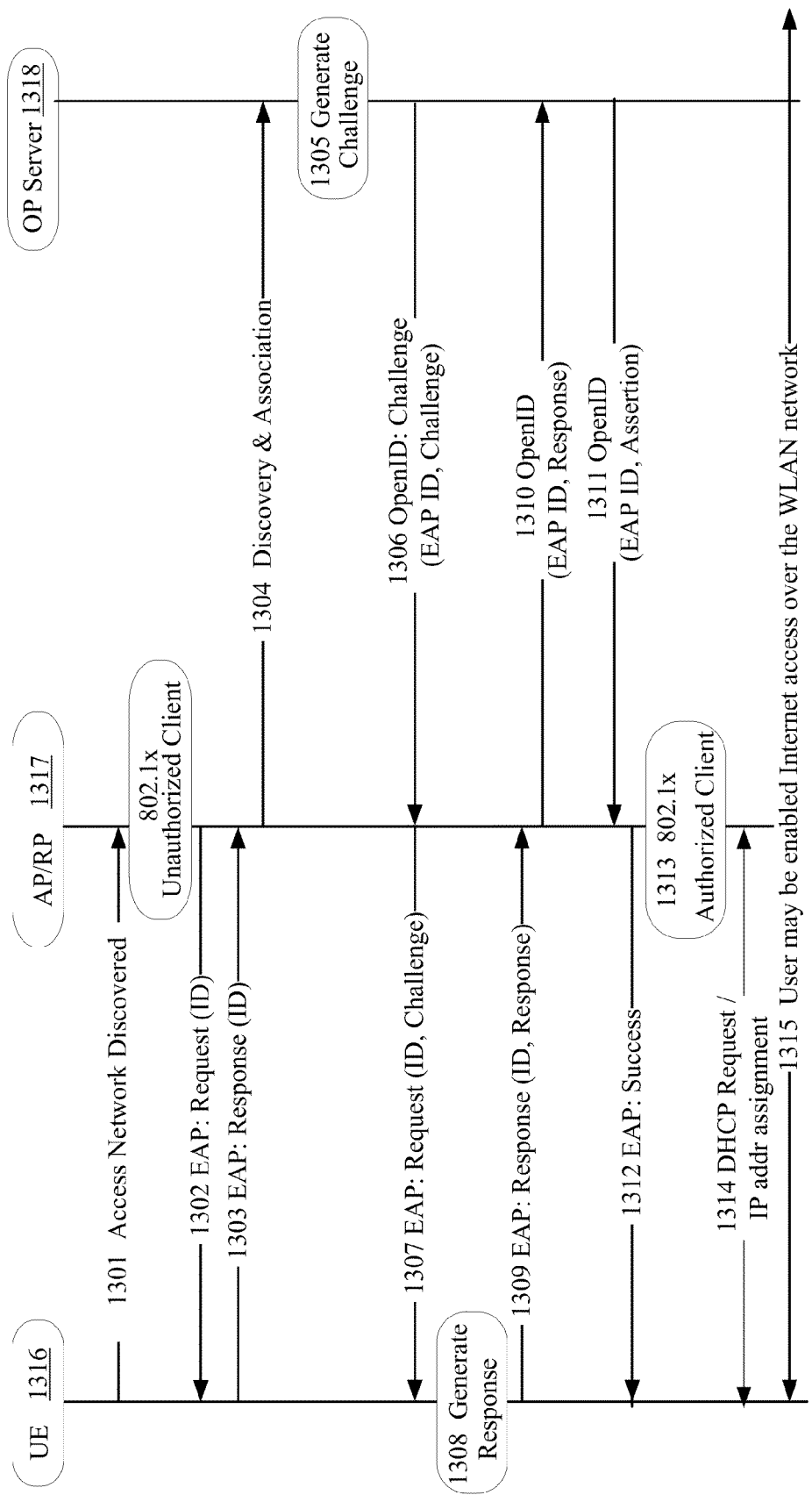
FIG. 13 is a flow diagram illustrating integration of OpenID messages into the EAP protocol messages.

FIG. 13 illustrates an example embodiment of a protocol flow for integration of OpenID messages into the EAP protocol messages. The protocol flow, or one similar thereto, may be implemented to enable some of the network communications illustrated in FIGS. 11 and 12 for example.

As illustrated in FIG. 13, UE 1316, AP/RP 1317, and/or OP server 1318 may perform communications to enable authentication of the UE 1316 at the network. The UE 1316 may discover the access network associated with AP/RP 1317 at 1301. At this point, the UE 1316 may be unauthorized for communication on the network. At 1302, the AP/RP 1317 may send a request for an EAP ID (e.g., an access-layer identity). The UE 1316 may send an OpenID identifier in an EAP response to the AP 1317 at 1303. Using the OpenID identifier, the AP 1317 may perform the discovery and/or association steps of the OpenID protocol with the OP server 1318 at 1304. In order to perform discovery and/or association, the AP 1317 may unwrap the OpenID messages (e.g., the OpenID identifier) from the EAP protocol and communicate with the OP server 1318 via HTTP(S). The establishment of an association in the OpenID protocol may be optional.

After association, the OP server 1318 may generate a challenge at 1305 and the AP 1317 may receive the OpenID challenge from the OP server 1318 at 1306. The AP 1317 may send an EAP request (corresponding to the OpenID redirect in the OpenID protocol), to the UE 1316 at 1307. With the help of a local OP, the UE 1316 may generate the correct response at 1308 and send the EAP response with the signed OpenID assertion to the AP 1317 at 1309. If the AP 1317 established an association with the OP server 1318, the AP 1317 may autonomously verify the assertion signature and thus authenticate and authorize the UE 1316. If no association has been established earlier, the AP 1317 may use the stateless mode to request signature verification by the OP server 1318, such as at 1310 for example. If the authentication is successful at the OP server 1318, the OP server 1318 may send an OpenID message at 1311 to AP/RP 1317 with the identity and an authentication assertion. The AP/RP 1317 may indicate successful authentication to UE 1316 at 1312 and the UE may be authorized for service via the AP/RP 1317 at 1313. At 1314, the UE 1316 may obtain (e.g., via DHCP request) an IP address from AP/RP 1317 and may be enabled internet access over the WLAN network at 1315.

The stateless mode may be 'forced' by the local OP even if AP 1317 and OP server 1318 already established an association. The local OP can set the field 'invalidate_handle' in the assertion message, and create a new association handle. The AP 1317 then may go back to the OP server 1318 for signature verification. This behavior of OpenID may be used to trigger a feedback mechanism from AP 1317 to OP server 1318 even if a local OP is in place and issues the assertion. If associations are used and not invalidated, there may be no feedback to the OP server 1318. The embodiments described herein may enable some payment scenarios and/or privacy for example.

According to an example embodiment, authentication of a user for services may be performed by establishing a connection between an AP and an AAA server of the MNO for AV fetching in the EAP protocol. By implementing OpenID an additional abstraction layer may be created between the AP and MNO network. The OP may act as a proxy to the network authentication infrastructure and authenticate UEs based on network credentials without giving a direct access to network AVs to connected APs. Since the OP acts as an authentication point, the logic in the AP may be reduced to verify an OpenID assertion. Using OpenID, there may be no need to deal with AVs at the AP. Additionally, the OP may serve multiple APs of different AP operators, since the APs do not have to have a direct connection to the MNO infrastructure. The OP may also act as a transaction authenticator (this may include the local OP for example). This may allow billing and/or benefit/bonus payment via the MNO back end for AP operators. Hence multiple MNOs may use the same OP. Multiple AP providers may also use the same OP. This may result in a 'star' architecture for example.

Embodiments herein may use a key derivation function, such as a generic bootstrapping procedure. For example, the Generic Bootstrapping Architecture (GBA) may be implemented. One example embodiment of GBA may be described in 3GPP Technical Specification (TS) 33.220. However, GBA may be limited to UICC-based credentials. The embodiments described herein may be implemented using UICC-based and/or non-UTCC-based credentials. GBA may also be limited to IP connectivity between the UE-BSF and UE-NAF to perform bootstrapping and authentication. This may cause GBA to break seamless mobility protocols, such as Mobile IP for example. Mobile IP may use authentication at/or below IP layer to perform switchover and bringing up the new interface such as WLAN interface and performing registration with the home agent (HA). The race condition between Mobile IP registration at the IP layer and GBA bootstrapping at the application layer may break mobility and may fail MIP registration and as a result switching to WLAN network may fail.

The EAP-GBA integration option may be used to solve the mobility problems between 3GPP and WLAN networks, such as for dual-mode devices based on GBA for example. GBA authentication may be performed over the existing 3GPP interface. The outcome of a GBA authentication (e.g., the Ks_NAF stored in the device) may be used to complete the EAP authentication in the hotspot. Mobility issues may be solved with GBA by providing the IP connectivity for the GBA authentication via 3GPP interface and using GBA-EAP integration for example.

Figure 14:
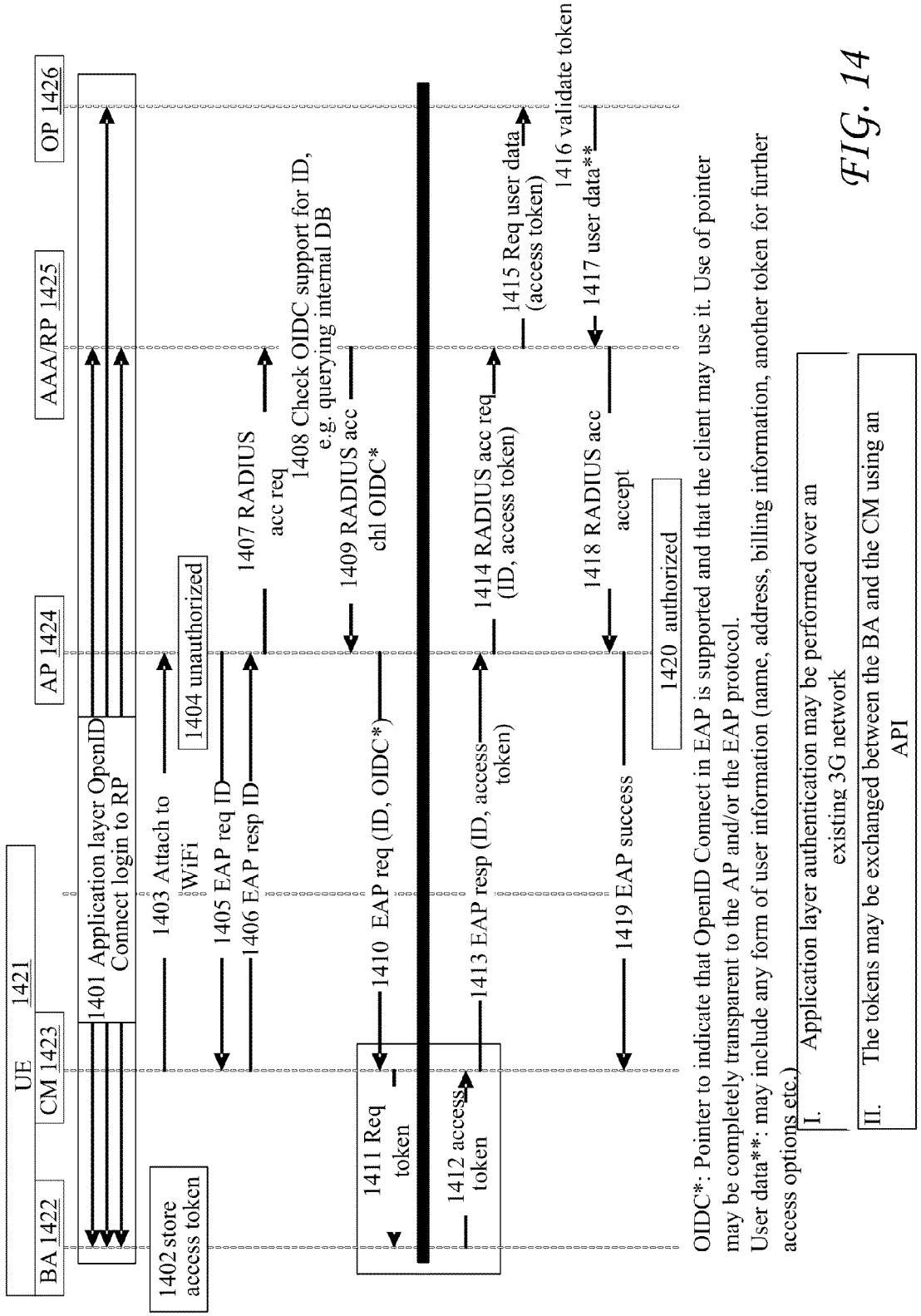
FIG. 14 is a flow diagram illustrating a user equipment (UE) authentication for services using OpenID Connect.

FIG. 14 is a flow diagram illustrating the UE 1421 authentication for services using OpenID Connect. As illustrated in FIG. 14, the UE 1421 may have an active wireless connection (e.g., 3GPP connection) and may reach AAA/RP server 1425 and/or OP server 1426 over this connection. At 1401, the UE 1421 may perform an OpenID Connect login to the AAA/RP server 1425, which may create an access token. The access token may be saved by the BA 1422 (or saved by the OS) at 1402. A local component on the UE, e.g., CM 1423, may discover the AP 1424, and its identification information such as an "MNO-WiFi" SSID, via the access layer signaling such as a beacon channel. The CM 1423 may decide that the UE 1421 should connect to the AP 1424. At 1403, the CM may attach to the AP 1424. The AP 1424 (e.g., authenticator) may set the UE 1421 state to unauthenticated or unauthorized at 1404.

At 1405, the AP 1424 may issue an EAP request asking for UE 1421 EAP/IP-layer identity. The UE 1421 may return an international mobile subscriber identity (IMSI) and/or other authentication information at 1406. The other authentication information may include its realm, which may include a hint to use SSO authentication (e.g., IMSI@sso.MNO.com) for example. At 1407, the AP 1424 may send the EAP ID received from the UE 1421 to AAA/RP server 1425 (e.g., using a RADIUS access request).

At 1408, the AAA/RP server 1425 may detect that the UE 1421 is capable of using the OpenID Connect based flow based on the EAP ID received (or by looking up a database using the received EAP ID). The AAA/RP server 1425 may send an EAP-SIM/AKA challenge to the AP 1424 at 1409 indicating that OpenID Connect should be used in the EAP protocol. The AP 1424 may send the EAP message received from the AAA/RP server 1425 (EAP-Request/Challenge) to the UE 1421 (e.g., at CM 1423).

After receiving the EAP-request/challenge message, the UE 1421 may check the authentication parameters in the message and may request the token from the BA 1422 (e.g., the BA may alternatively be an OS or API) at 1411. The access token may be returned to the CM 1423 at 1412. At 1413, the CM 1423 may send the access token in the EAP message to the AP 1424. The AP 1424 may forward the EAP-response/challenge message to the AAA/RP server at 1414. The AAA/RP server 1425 may verify the token and then uses the token with the user info endpoint from the OP server 1426 to retrieve user info for authentication from the OP server 1426 at 1415.

The OP server 1426 may validate the token before releasing the user info. The AAA/RP server 1425 may receive the user info at 1417. The user info may include username, address, billing info, and/or a billing token for example. The AAA/RP server 1425 may perform authentication checks based on the user info received at 1417. When all checks are successful, the AAA/RP server may send an indication of successful authentication to the UE 1421. For example, the AAA/RP server 1425 may send an access accept message that includes an EAP success and the keying material to the AP 1424 at 1418. The EAP success message may forwarded to the UE 1421 at 1419. At 1420, the UE 1421 status become authorized for access on the network on the AP 1424. The UE 1421 may obtain an IP address (e.g., using DHCP) and may access the Internet via the AP 1424.

Figure 15:
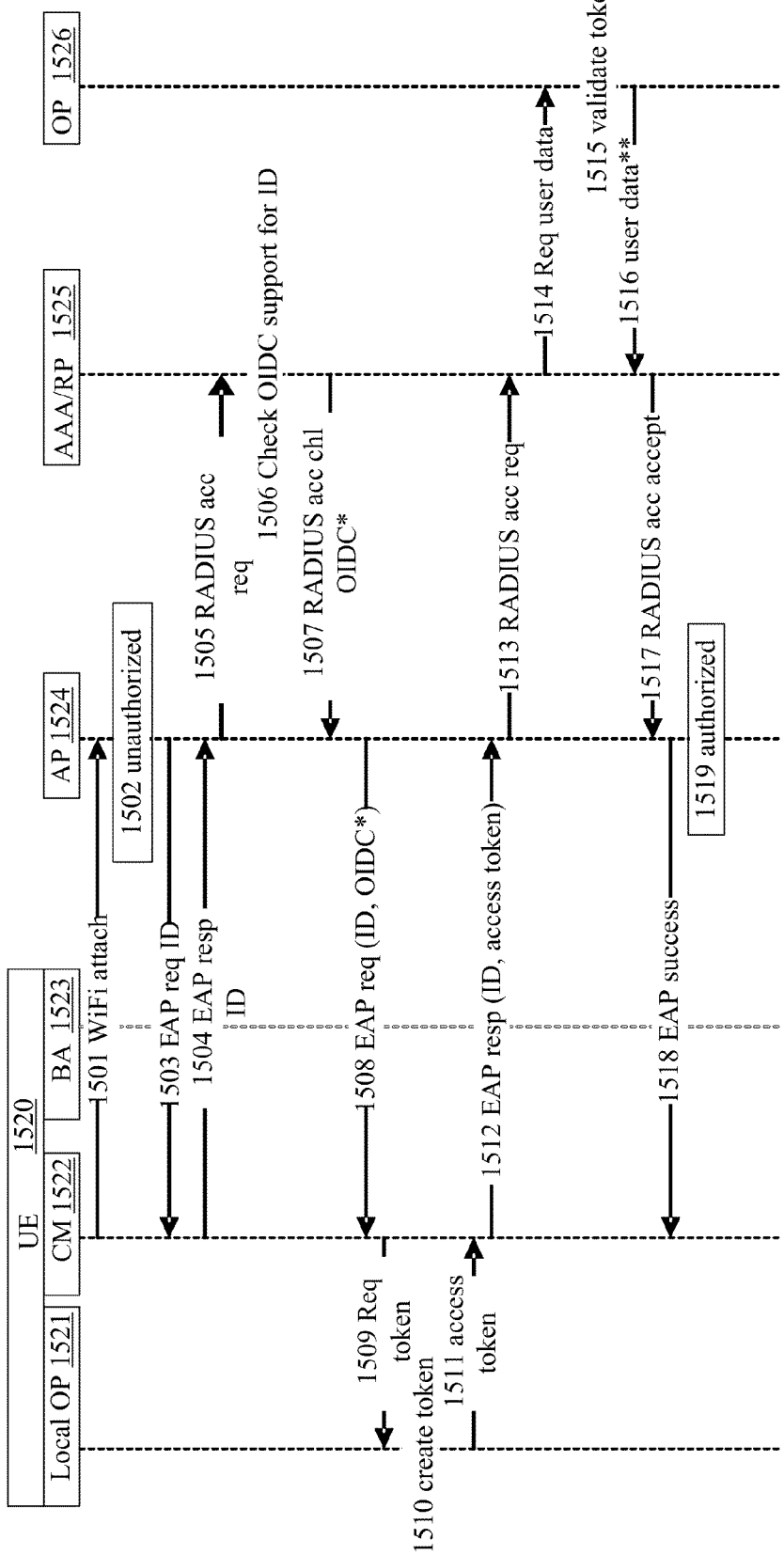
FIG. 15 is a flow diagram illustrating authentication of a UE for services using OpenID Connect and local OP.

FIG. 15 is a flow diagram illustrating authentication of the UE 1520 for services using OpenID Connect and local OP. As illustrated in FIG. 15, a local component on the UE 1520, e.g., a CM 1522, may discover the AP 1524, and/or its identification information. The AP 1524 and/or its identification information may include an "MNO-WiFi" SSID, which may be discovered via access layer signaling, such as a beacon channel for example. The CM 1522 may decide that the UE 1520 should connect to the AP 1524.

At 1501, the UE 1520 may attach to the AP 1524. The AP 1524 (e.g., authenticator) may set the UE 1520 state to unauthenticated or unauthorized for communication at 1502. The AP 1524 may issue an EAP request at 1503 asking for UE IP-layer/EAP identity. The UE 1520 may return its IP-layer/EAP identifier at 1504. For example, the UE 1520 may return an international mobile subscriber identity (IMSI) and/or additional authentication information. The additional authentication information may include its realm, which may include a hint to use SSO authentication (e.g., IMSI@sso.MNO.com) for example.

The AP 1524 may send the EAP ID to AAA/RP server 1525 at 1505. The communications between the AP 1524 and AAA/RP server 1525 may be performed using RADIUS messages, such as an access request message, and access challenge, and/or an access accept message for example. At 1506, the AAA/RP server may detect that the UE 1520 is capable of using the OpenID Connect based flow based on the EAP identity received (or by looking up a database using the received EAP identity for example). The AAA/RP server may send an EAP-SIM/AKA challenge to the AP 1524 at 1507. The challenge may indicate that OpenID Connect should be used in the EAP protocol. The indication may be transparent to the AP 1524 and/or the EAP protocol. Instead of an indication, the AAA/RP server 1525 may create an OpenID Connect request object (e.g., JSON) and may put an indicator (URL) to it into the request.

At 1508, the AP 1524 may send the EAP message received from the AAA/RP server 1525 (EAP-request/challenge) to the UE 1520 (e.g., at the CM 1522). After receiving the EAP-request/challenge message, the UE 1520 may check the authentication parameters and uses the OpenID Connect request object to initiate an OpenID Connect session with the local OP 1521 at 1509. The local OP 1521 may create the access token at 1510 (e.g., after a successful local user authentication). The access token may be returned to the CM 1522 at 1511. At 1512, the CM 1522 may send the access token in the EAP message to the AP 1524. The AP 1524 may forward the EAP-Response/Challenge message to the AAA/RP server 1525. The AAA/RP server 1525 may verify the token and use the token, with the user info endpoint from the OP server 1526, at 1514 to retrieve the user data for authentication.

At 1515, the OP server 1526 may validate the token before being able to release the user info for authentication. The AAA/RP server 1525 may receive the user info at 1516. The user info may include the username, address, billing info, and/or billing token for example. The AAA/RP server 1525 may use the user info received at 1516 to perform authentication of the user and, when the checks are successful, the AAA/RP server 1525 may send an indication of successful authentication to the UE 1520 at 1517. For example, the AAA/RP server 1525 may send an access accept message, which may include an EAP success message and/or the keying material, to the AP 1524. The EAP success message may be forwarded to the UE 1520 at 1518 (e.g., to the CM 1522). The UE 1520 status may become authorized on the AP 1524 at 1519. The UE 1520 may obtain an IP address (e.g., using DHCP) and may access the Internet via the AP 1524.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for generating an authentication credential for use in an authentication of a mobile device, the method comprising:
    establishing, via a persistent communication layer between the mobile device and a first network, a persistent communication layer credential that is shared with a network server, wherein the persistent communication layer credential is configured to authenticate the mobile device on the persistent communication layer for receiving a service from the network server using the first network;
    discovering a network communication entity on a second network; and
    generating, based on the persistent communication layer credential, the authentication credential for performing authentication on a communication layer of the second network, wherein the authentication at the second network enables the mobile device to switch from the first network to the second network and receive the service from the network server using the second network, the persistent communication layer credential surviving the switch from the first network to the second network.

2. The method of claim 1, wherein the persistent communication layer comprises an application layer, and wherein the persistent communication layer credential comprises an application-layer credential.

3. The method of claim 2, further comprising:
    determining an application-layer identity for communicating with the network communication entity at an application layer of the second network;
    determining an access-layer identity from the application layer identity for communicating with the network communication entity at an access layer of the second network; and
    sending the access layer identity to the network communication entity of the second network to initiate generation of the authentication credential.

4. The method of claim 2, wherein the mobile device is configured to communicate the authentication credential from the application layer to the communication layer of the second network.

5. The method of claim 2, wherein the authentication credential is generated from the application-layer credential using a key derivation function.

6. The method of claim 1, wherein the communication layer of the second network comprises an access layer of the second network and wherein the authentication credential is an access-layer credential.

7. The method of claim 6, wherein the access-layer credential comprises a session key.

8. The method of claim 6, further comprising authenticating the mobile device on the first network using another access-layer credential.

9. The method of claim 8, wherein the persistent communication layer credential is established using the access-layer credential that is used to authenticate the mobile device on an access layer of the first network.

10. The method of claim 1, wherein the first network is a cellular communications network and wherein the second network is a wireless local area network (WLAN).

11. The method of claim 1, wherein the method is performed during a communication layer handoff.

12. The method of claim 1, wherein the network communication entity comprises an access point (AP) or a Hotspot, and wherein the network server comprises an authentication, authorization, and accounting (AAA) server, a wireless local area network (WLAN) gateway, or a WLAN access point (AP).

13. The method of claim 12, wherein the AAA server comprises an OpenID provider (OP) server, and wherein the WLAN gateway and the WLAN AP comprise a relying party (RP).

14. The method of claim 13, wherein the OP comprises a mobile network operator (MNO) or an application service provider (ASP) associated with the MNO.

15. The method of claim 1, wherein the authentication credential is generated at a local OpenID provider (OP).

* * * * *